(12) United States Patent
Müller

(10) Patent No.: US 7,788,922 B2
(45) Date of Patent: Sep. 7, 2010

(54) SYSTEM AND METHOD FOR MODEL BASED BOOST CONTROL OF TURBO-CHARGED ENGINES

(75) Inventor: Martin Müller, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 350 days.

(21) Appl. No.: 11/867,376

(22) Filed: Oct. 4, 2007

(65) Prior Publication Data

US 2009/0090106 A1    Apr. 9, 2009

(51) Int. Cl.
*F02D 23/00* (2006.01)
(52) U.S. Cl. .......................... 60/602; 60/600
(58) Field of Classification Search .................. 60/600, 60/602
See application file for complete search history.

(56) References Cited

U.S. PATENT DOCUMENTS

| | | | |
|---|---|---|---|
| 4,646,522 A * | 3/1987 | Mamiya et al. | 60/602 |
| 4,763,475 A * | 8/1988 | Toshio et al. | 60/602 |
| 5,036,663 A * | 8/1991 | Akagi et al. | 60/600 |
| 5,154,058 A * | 10/1992 | Mizuno | 60/600 |
| 5,623,825 A * | 4/1997 | Kempka et al. | 60/602 |
| 5,873,248 A * | 2/1999 | Houtz | 60/602 |
| 6,732,523 B2 | 5/2004 | Birkner et al. | |
| 6,904,353 B1 * | 6/2005 | Kolavennu et al. | 60/602 |
| 7,047,740 B2 * | 5/2006 | Fukasawa et al. | 60/602 |
| 2005/0056012 A1 * | 3/2005 | Wild et al. | 60/602 |
| 2006/0213194 A1 * | 9/2006 | Hasegawa | 60/602 |
| 2006/0248889 A1 * | 11/2006 | Sagisaka et al. | 60/602 |
| 2008/0282698 A1 * | 11/2008 | Ferrari et al. | 60/602 |
| 2009/0019848 A1 * | 1/2009 | Ballauf et al. | 60/602 |
| 2009/0094009 A1 * | 4/2009 | Muller | 703/7 |

OTHER PUBLICATIONS

Charles Fayette Taylor, "The Internal-Combustion Engine in Theory and Practice", vol. 1: Thermodynamics, Fluid Flow, and Performance, Second Edition, Revised, 1998, pp. 461-463.*

Schopp, "Model Based Engine Control Function for Turbocharged Gasoline Engines", Siemans VDO Automotive AG, 2005, see English translation provided by the USPTO.*

(Continued)

*Primary Examiner*—Thomas E Denion
*Assistant Examiner*—Mary A Davis
(74) *Attorney, Agent, or Firm*—Thomas N. Twomey

(57) ABSTRACT

A system and method for controlling boost pressure in various turbo-charged engine configurations as well as variable geometry turbine (VGT) arrangements includes an electronic controller programmed to receive a predetermined desired boost pressure $P_{Boost}^{des}$. A desired pressure delta $\Delta P_{WG}^{des}$ across a waste-gate valve is determined using the desired boost pressure $P_{Boost}^{des}$. A control signal is generated for controlling the waste-gate valve so as to achieve the desired pressure delta $\Delta P_{WG}^{des}$. In boost pressure and vacuum pneumatically-actuated waste-gate valve arrangements, the respective solenoid duty cycles are obtained through use of various data structures. Where a waste-gate valve position is controlled by an electrical motor, the valve position is determined using a data structure as a function of desired waste-gate valve flow at sonic standard conditions.

17 Claims, 7 Drawing Sheets

OTHER PUBLICATIONS

"Mean effective pressure", Wlkipedia, Nov. 5, 2009, pp. 1-3.*
SAE Technical Paper Series, 2001-01-0553, "Dynamic EGR Estimation for Production Engine Control," Martin Muller, Peter M. Olin and Bart Schreurs, SAE 2001 World Congress, Detroit, MI, Mar. 5-8, 2001.
SAE Technical Paper Series, 980784, "Mean Value Modelling of Turbocharged Spark Ignition Engines," Martin Muller, Elbert Hendricks and Spencer C. Sorenson, Int'l Congress and Exposition, Detroit, MI, Feb. 23-26, 1998.
Aachener Kolloquium Fahrzeug—und Motorentechnik 2005, Modellbasierte Motorsteuerungsfunktion fur aufgeladene Ottomotoren, "Model Based Control Function for Turbo Charged Spark Ignition Engines," Dr. Gerhard Schopp, Dr. Roland Schwarz, Dr. Thomas Burkhardt, Dipl.-Ing. Achim Koch, Dipl.-Ing. Bjorn Miener, Siemens VDO Automotive AG, Regensburg.
Appendix C, Equations for Fluid Flow Through a Restriction, John B. Heywood, "Internal Combusion Engine Fundamentals," ISBN P-070100499-8.

* cited by examiner

SYSTEM AND METHOD FOR MODEL BASED BOOST CONTROL OF TURBO-CHARGED ENGINES

RELATED APPLICATIONS

This application is related to co-pending application entitled "SYSTEM AND METHOD FOR MODELING TURBO-CHARGED ENGINES AND INDIRECT MEASUREMENT OF TURBINE AND WASTE-GATE FLOW AND TURBINE EFFICIENCY," Ser. No. 11/867,422 owned by the common assignee of the present invention and herein incorporated by reference in its entirety.

TECHNICAL FIELD

The present invention relates to a system and method for model based boost control of turbo-charged engines.

BACKGROUND OF THE INVENTION

A turbo-charged internal combustion engine includes additional components and physical processes in both the intake and exhaust stream. On the intake side of the engine, a centrifugal compressor and intercooler are provided and are located between the air cleaner and a throttle valve. On the exhaust side, a turbine and a waste-gate—which defines a parallel exhaust stream path with the turbine—are both located between the exhaust manifold and the catalyst/muffler. It is known to provide an engine management system (EMS) configured to control the operation of a turbo-charged engine, including boost control. However, such an EMS is conventionally configured to perform its functions with only a minimal amount of additional information, notwithstanding the increased system complexity, in order to maintain reduced costs (i.e., by reducing the number of sensors). Conventionally, the additional sensors added when an engine is turbo-charged are all located on the intake side (e.g., a boost pressure sensor and boost temperature sensor).

As to boost control, conventional systems do not adequately address efficiency considerations. More specifically, conventional controls do not adequately address the desire for producing the optimum amount of boost for a needed amount of engine torque. As a result, the turbine presents an unnecessarily large restriction to the engine exhaust, which decreases efficiency. Also, the compressor ends up producing too much boost, which must thereafter be decreased downstream by the intake throttle, also resulting in operating inefficiency. This unnecessarily decreases fuel economy. Also, conventional control systems are specific to a particular implementation type, which reduces its applicability to other waste-gate mechanization approaches.

There is therefore a need for a system and method for controlling the boost pressure to a turbo-charged engine that minimizes or eliminates one or more of the problems set forth above.

SUMMARY OF THE INVENTION

The present invention provides for increases engine efficiency. The invention enables accurate boost control. This in turn allows setting the desired boost to an optimum, desired boost needed to satisfy requested engine torque without any intake throttling. This results in increased efficiency. Moreover, the invention incorporates the flexibility to work with a variety of waste-gate mechanizations.

A method is provided of controlling the boost pressure to an internal combustion engine having a turbo-charger with a compressor and an exhaust driven turbine with a parallel-path waste-gate adjusted by a waste-gate valve. The method includes a number of steps. In a preferred embodiment, the first step involves determining a desired waste-gate mass flow rate at standard sonic conditions $\dot{m}_{WG}^{des@SonicStdCond}$ across the waste-gate valve using a predetermined (i.e., given) desired boost pressure $P_{Boost}^{des}$. This step is common across a wide variety of waste-gate mechanizations, resulting in increased flexibility. The method also involves the step of generating a control signal for controlling the waste-gate valve so as to achieve the desired flow rate $\dot{m}_{WG}^{des@SonicStdCond}$. In alternate embodiments, the control signal may be customized to various pneumatically-actuated and electrically-actuated waste-gate valve mechanizations.

In an alternate embodiment, one use for the method involves determining a desired boost pressure $P_{Boost}^{des}$ and a desired engine air mass flow rate $\dot{m}_{eng,air}^{des}$ based on a requested engine torque. As above, this allows for increased engine operating efficiency. Of course, the method for controlling boost pressure may be used for many other applications, and is dependent on just a given value for the desired boost pressure $P_{Boost}^{des}$ as an input.

Other features, object and advantages of the present invention are also presented.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
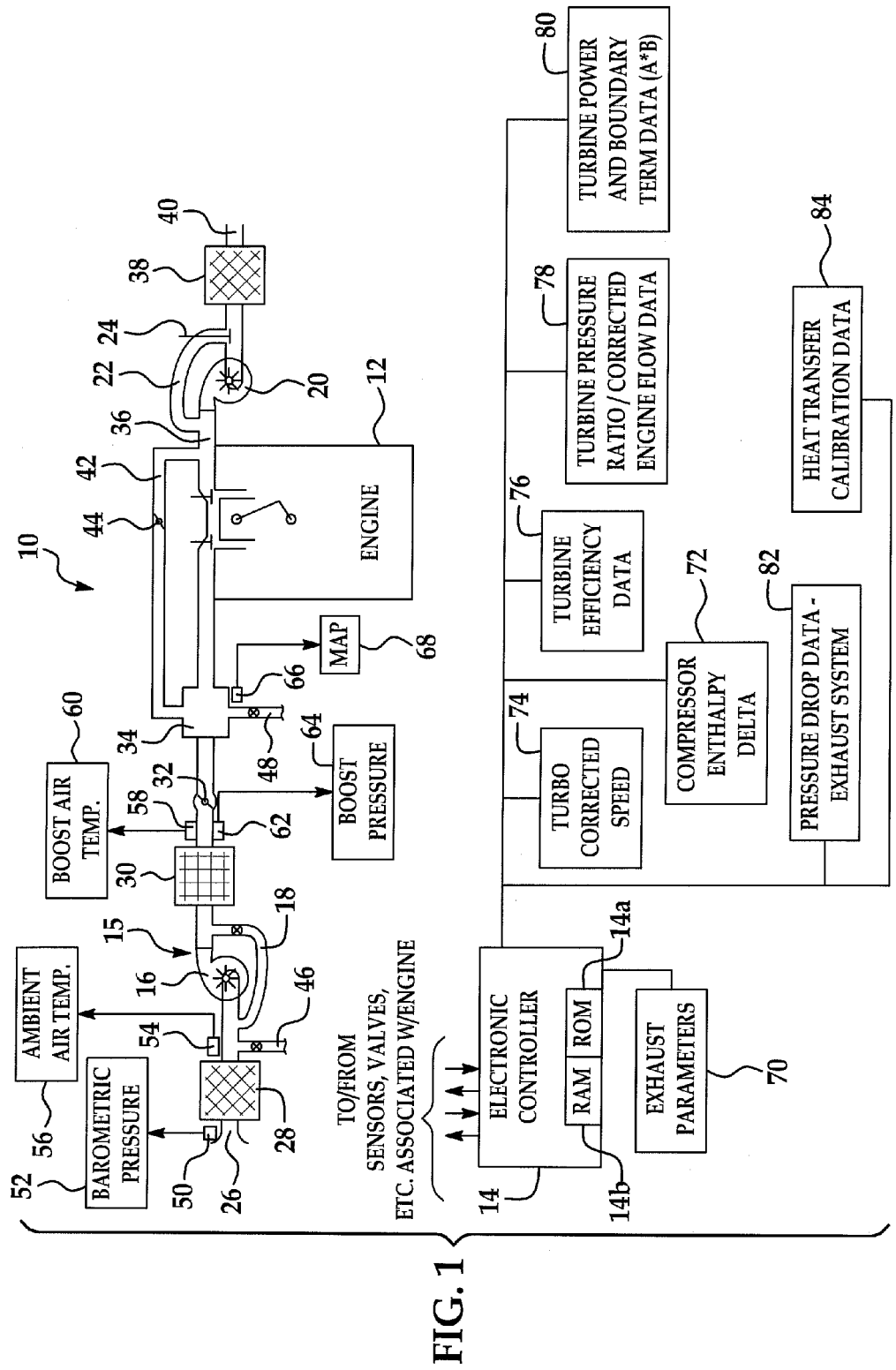
FIG. 1 is simplified diagrammatic and block diagram of a turbo-charged engine system having a controller configured for model-based boost control.

Referring now to the drawings wherein like reference numerals are used to identify identical components in the various views, FIG. 1 is a diagrammatic view of a turbo-charged internal combustion engine system 10 configured in accordance with the present invention. The system 10 includes an internal combustion engine 12 controlled by an electronic engine controller 14 all in accordance with the present invention.

Engine 12 may be a spark-ignition engine that includes a number of base engine components, sensing devices, output systems and devices, and a control system. Alternatively, the present invention may be used with compression-ignition engines, such as diesel or the like.

Generally, electronic controller 14 is configured via suitable programming to contain various software algorithms and calibrations, electrically connected and responsive to a plurality of engine and vehicle sensors, and operably connected to a plurality of output devices. Controller 14 includes at least one microprocessor or other processing unit, associated memory devices such as read only memory (ROM) 14a and random access memory (RAM) 14b, input devices for monitoring input from external analog and digital devices, and output drivers for controlling output devices. In general, controller 14 is operable to monitor engine operating conditions and operator inputs using the plurality of sensors, and control engine operations with the plurality of output systems and actuators, using pre-established algorithms and calibrations that integrate information from monitored conditions and inputs. The software algorithms and calibrations which are executed in electronic controller 14 may generally comprise conventional strategies known to those of ordinary skill in the art. These programmed algorithms and calibrations are configured, when executed, to monitor the engine operating conditions and operator demands using the plurality of sensors, and control the plurality of engine actuators accordingly. The software algorithms and calibrations are preferably embodied in pre-programmed data stored for use by controller 14.

System 10 further includes a turbo-charger 15 having a compressor 16, which may include a compressor recirculation path 18, and an exhaust gas driven turbine 20, which includes a parallel waste-gate flow path 22. As known, the compressor is driven by the turbine, and the amount of boost is controlled principally by a waste-gate control mechanism (e.g., valve) shown schematically as a waste-gate valve 24. For purposes of the present invention, the waste-gate valve 24 may actuated through any of several waste-gate actuation mechanizations, including but not limited to (1) pneumatic actuation of the waste-gate valve using boost pressure as an actuation source, which will have a solenoid under the control of the controller 14 adjusting the amount of boost pressure routed to the actuator (see FIG. 2); (2) pneumatic actuation of the waste-gate valve using vacuum from a vacuum pump as the actuation source, which will have a solenoid under the control of the controller 14 adjusting the amount of vacuum routed to the actuator (see FIG. 3); and (3) an electrically controlled waste-gate valve (i.e., where the waste-gate valve is directly moved by an electric motor or the like under the control of controller 14—see FIG. 4).

On the air intake side of the engine 12, FIG. 1 shows an air intake port 26, an air filter 28, an intercooler 30 configured to cooperate with and complement compressor 16, a throttle valve 32, and an intake manifold 34. These features are well known and understood in the art. In the context of the present invention, these features may comprise conventional implementations.

On the exhaust side of the engine 12, FIG. 1 shows an exhaust gas manifold 36. Additionally, various downstream exhaust components are conventionally included in system 10, such as a catalytic converter and a muffler, and are shown schematically as a single exhaust restriction block 38, which feeds into exhaust gas outlet 40. These features are well known and understood in the art. In the context of the present invention, these features may comprise conventional implementations.

Conventionally, a variety of feedback paths are provided in system 10. For example, FIG. 1 shows an exhaust gas recirculation (EGR) tube or the like coupled between the exhaust manifold 36 and the intake manifold 34, and whose flow path is adjusted by way of an EGR valve 44. As known, the EGR valve 44 may be controlled by the electronic controller 14 in accordance with conventional EGR algorithms configured to achieve predetermined performance criteria. Generally, varying the position of the valve 44 alters the amount of exhaust gas that is provided to the intake manifold 34 for mixing with intake air, fuel and the like destined for combustion in engine 12.

With continued reference to FIG. 1, additional feeds may also be provided. For example, evaporative emissions control and diagnostics generally call for an evaporative ("evap") emissions canister (not shown) be provided in an automotive vehicle that includes system 10. The evap canister is coupled to a fuel tank (not shown) as well as to inlets 46 and 48 by a combination of vent, purge and check valves, all as known in the art. For purposes of the present invention, however, the impact of these features may be ignored while the evap emissions and control system is not in operation (i.e., when not performing a purge cycle or a diagnostic cycle).

FIG. 1 also shows a variety of sensors deployed on the intake side of the engine 12, including an ambient or barometric pressure sensor 50 configured to produce a barometric pressure signal 52, an ambient air temperature sensor such as an intake air temperature (IAT) sensor 54 configured to generate an IAT signal 56, a boost air temperature sensor 58 configured to generate a boost air temperature signal 60, a boost pressure sensor 62 configured to generate a boost pressure signal 64, and an intake manifold pressure sensor such as a manifold absolute pressure (MAP) sensor 66 configured to generate a MAP signal 68. These sensors and their functioning are all well known and understood in the art. For purposes of the present invention, these sensors may all comprise conventional components.

Additionally, system 10 includes capabilities for determining a value for the mass air flow $\dot{m}_C$, which may be obtained either via measurement by an air meter (e.g., mass air flow sensor or MAF sensor-not shown) typically placed just upstream of the compressor 16, or, in an alternate embodiment, calculated by the well known speed-density equation, for example as set forth in U.S. Pat. No. 6,393,903 entitled VOLUMETRIC EFFICIENCY COMPENSATION FOR DUAL INDEPENDENT CONTINUOUSLY VARIABLE CAM PHASING to Reed et al., assigned to the common assignee of the present invention, and incorporated herein by reference in its entirety.

As described in the Background, in systems that include a turbo-charger 15, as compared to a naturally aspirated engine, the engine management system (EMS) implemented in electronic controller 14 must perform all its normal calculations and control functions, but is also configured to control, among other things, the amount of boost provided by the turbo-charger.

FIG. 1 shows in block form various desired exhaust states 70, as described in co-pending application entitled "SYSTEM AND METHOD FOR MODELING TURBO-CHARGED ENGINES AND INDIRECT MEASUREMENT OF TURBINE AND WASTE-GATE FLOW AND TURBINE EFFICIENCY." It should be understood that this representation is not meant to mean necessarily that these exhaust parameters are communicated physically outside of the controller 14.

As will be described in greater detail below, the present invention employs a first set of various data tables or the like to store required data for the purpose of exhaust state estimation, including but not limited to a compressor enthalpy delta data table 72 (sometimes referred to herein as "Table1"), a turbo-charger corrected rotational speed data table 74 (sometimes referred to herein as "Table2"), a turbine isentropic efficiency data table 76 (sometimes referred to herein as "Table3"), a turbine pressure ratio/corrected engine flow data table 78 (sometimes referred to herein as "Table4"), a turbine power and boundary term (A*B) data table 80 (sometimes referred to herein as "Table5"), an exhaust pressure drop data table 82 (sometimes referred to herein as "Table6"), and a heat transfer calibration data 84 (sometimes referred to herein as "Table7").

Figure 2:
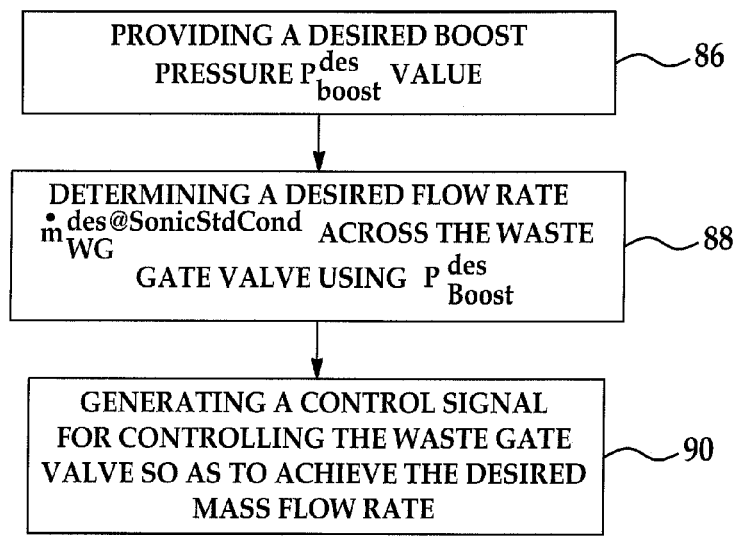
FIG. 2 is a flow chart diagram showing the boost control method of the present invention.

FIG. 2 is a simplified flowchart of a method according to the invention. The method begins in step 86.

In step 86, a desired boost pressure is provided to the method for controlling boost pressure. The desired boost pressure is determined based on operator input and the like which collectively correspond to a desired produced engine torque. Typically, an engine management system (i.e., EMS implemented in controller 14) in which model-based boost control is implemented is of the torque based control type. In this case, a torque control structure will translate the driver torque request into the desired engine airflow, and the air control structure will translate that into a desired intake manifold pressure, and ultimately decide throttle position. An advantage of turbo-charged engines with actively controlled boost pressure is improved fuel economy by operating un-throttled as much as possible. This can be achieved by setting the desired boost pressure $P_{Boost}^{des}$ (upstream of the throttle) equal to the desired intake manifold pressure mentioned above. It should be understood, however, that trade-offs with regard to other operating parameter may result in a desired boost pressure that is different than what might be considered optimum for fuel efficiency purposes (e.g., the EMS may decide to keep the boost pressure higher than optimum and throttle it down using the throttle so as to keep the turbine rotating, which can improve responsiveness-many other situations are possible). Furthermore, since the maximum boost pressure that a turbo-charged engine is capable of producing will exceed the engines structural limitation, and knock limit for a spark ignition engine, the desired boost will be limited to a calibratable maximum value. The result of this conventional torque-based control logic is the input to the boost control logic of the present invention, namely; desired boost pressure $P_{Boost}^{des}$ (and optionally desired engine air flow $\dot{m}_{eng,air}^{des}$ which as noted above is calculated and available per a torque based control). Alternatively, however, in a non torque-based control configuration, where a desired engine flow is not normally calculated, the desired boost pressure can nonetheless be translated to a desired engine flow $\dot{m}_{eng,air}^{@des\,Boost}$ by the well known speed-density calculation referred to elsewhere herein by replacing actual intake manifold pressure (e.g., MAP signal 68 in FIG. 1) with desired boost $P_{Boost}^{des}$ in the speed-density calculations. In either configuration, now having a given desired boost pressure $P_{Boost}^{des}$, the method proceeds to step 88.

In step 88, the method involves determining a desired waste-gate mass flow rate at sonic standard conditions $\dot{m}_{WG}^{des@SonicStdCond}$ from the inputs desired Boost $P_{Boost}^{des}$. The present invention uses a model of the exhaust states as the basis for model-based boost control. Ultimately, this allows the conversion of a desired boost into (1) the desired waste-gate valve flow and (2) desired waste-gate valve delta pressure (which equals desired turbine delta pressure), for all three waste-gate mechanizations described herein. It is significant that the exhaust state estimation model allows these calculations using only predictive (desired) variables as opposed to actual states, which avoids control instability. Furthermore, these calculations are identical for all waste-gate mechanizations to be described, and use various predetermined data tables (i.e., calibrations that may already be available for the estimation logic). The method proceeds to step 90.

In step 90, the method converts the desired waste-gate flow rate at standard sonic conditions $\dot{m}_{WG}^{des@SonicStdCond}$ into an actuator control command, and is unique for each mechanization type. In other words, a control signal is generated for controlling the waste-gate valve so as to achieve the desired waste-gate flow rate at standard sonic conditions $\dot{m}_{WG}^{des@SonicStdCond}$. The further conversion of the desired waste-gate valve flow and delta pressure into the actuator command is specific to each mechanization. Generally, for the pneumatic actuators (i.e., boost pressure or vacuum type), it is recognized that the waste-gate valve position is the result of the force balance across the waste-gate valve linkage. The force on one side is generated by the delta pressure across the waste-gate valve and the counteracting force is generated by the delta pressure across the waste-gate actuation diaphragm. A given force balance results in a given waste-gate valve position, which is equivalent to an effective flow area which can be converted to a waste-gate valve flow. This means that a unique calibration can be created which describes the desired waste-gate diaphragm delta pressure as a function of desired waste-gate valve flow at standard sonic conditions and desired waste-gate delta pressure. This can be converted into the desired solenoid duty-cycle using the tabulated solenoid characteristic. For electrically-controlled type mechanization, the desired waste-gate valve flow can be converted into a desired waste-gate valve position by inverting the waste-gate flow characteristic just like converting desired throttle flow into desired throttle position.

Figure 3:
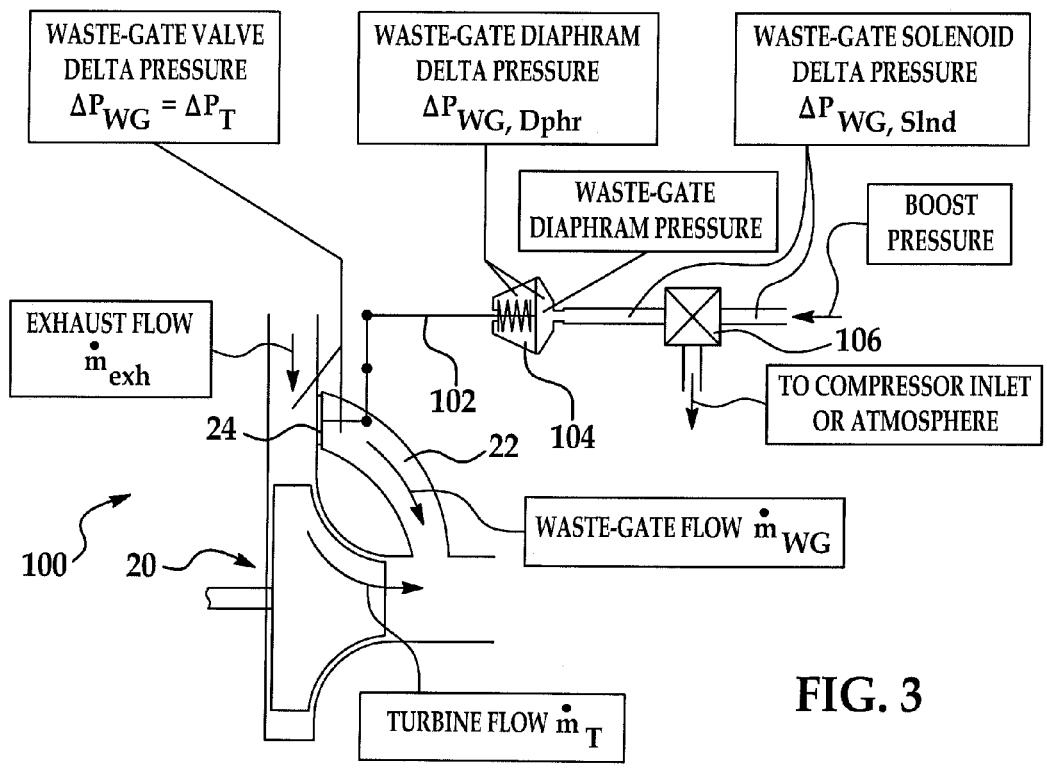
FIGS. 3-5 are diagrammatic views of boost-based pneumatic, vacuum-based pneumatic, and electrically actuated waste-gate valve mechanizations.

FIG. 3 shows, in greater detail, a first pneumatic actuation mechanization 100 employing boost pressure. Turbine 20 includes a turbine flow path and a waste-gate flow path 22. The waste-gate valve 24 is connected via a linkage 102 to a waste-gate diaphragm 104. The waste-gate diaphragm 104, in turn, is pneumatically controlled via a waste-gate solenoid 106 coupled to a source of boost pressure. Typically, the source is the boost pressure generated by the turbo compressor.

Figure 4:
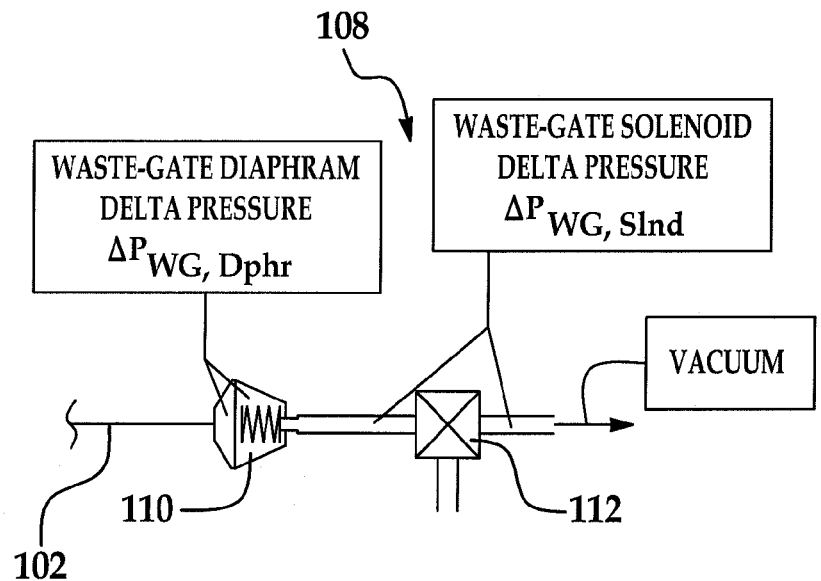

FIG. 4 shows, in greater detail, a second pneumatic actuation mechanization 108 including a waste-gate diaphragm 110 and a waste-gate solenoid 112 coupled to a source of vacuum. Typically, the vacuum source is from an engine driven vacuum pump.

Figure 5:
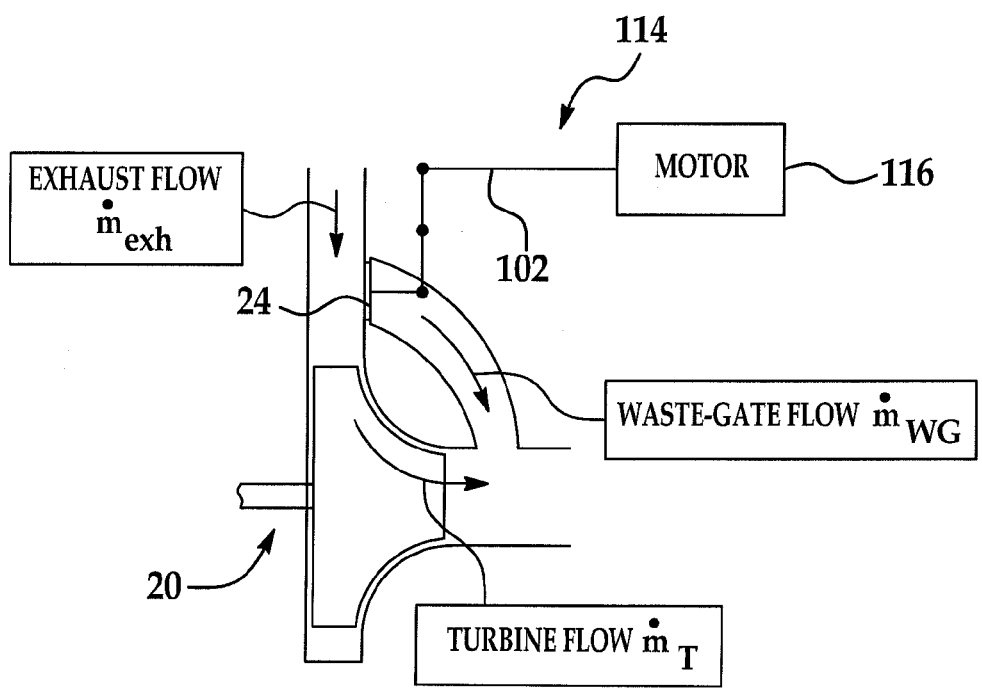

FIG. 5 shows, in greater detail, a third mechanization 114 where the waste-gate valve 24 is controlled, either directly or through use of a linkage 102, by an electrically-controlled device such as an electrical motor 116.

Figure 6:
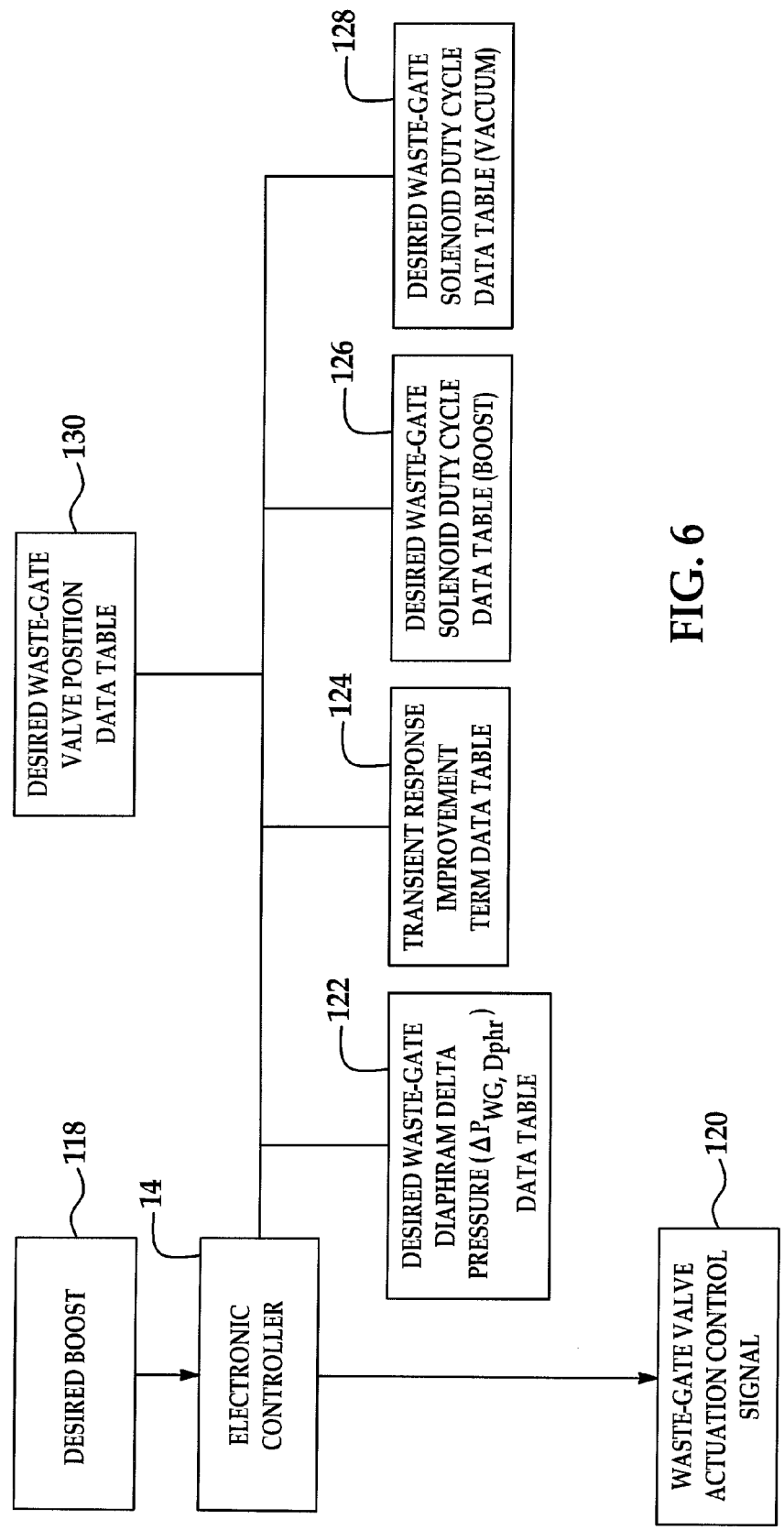
FIG. 6 is a block diagram of one embodiment of model-based boost control.

FIG. 6 is a block diagram view showing electronic controller 14 including additional tables specific to converting desired boost (see block 118) into specific control signals (see block 120) for all three waste-gate mechanizations 100, 108 and 114. Additional tables include a desired waste-gate diaphragm delta pressure data table 122 (sometimes referred to herein as "TableC1"), a transient response improvement term data table 124 (sometimes referred to herein as "TableC2"), a desired waste-gate solenoid (for boost pressure configurations) duty cycle data table 126 (sometimes referred to herein as "TableC3"), a desired waste-gate solenoid (for vacuum configurations) duty cycle data table 128 (sometimes referred to herein as "TableC4") and a desired waste-gate valve position data table 130 (sometimes referred to herein as "TableC5"). The purpose of these tables will be described more fully below. Also, a description of how to populate the data in these tables will also be described below.

In the case of torque based control, the desired engine air flow calculated in the torque control structure of controller 14 may under high load request conditions exceed the actual engine airflow while operating at the maximum desired boost level. Therefore, the well known speed-density calculation is used to estimate the engine airflow at the maximum desired boost level $\dot{m}_{eng,air}^{@Max\ des\ Boost}$ by replacing actual intake manifold pressure (e.g., MAP signal 68 in FIG. 1) with the maximum desired boost $P_{Boost}^{des,Max}$ in the speed-density calculations.

In the case of non-torque based control, where a desired engine flow is not normally calculated, the desired boost can be translated to a desired engine flow $\dot{m}_{eng,air}^{@des\ Boost}$ by the well known speed-density calculation by replacing actual intake manifold pressure (e.g., MAP signal 68 in FIG. 1) with desired boost $P_{Boost}^{des}$ in the speed-density calculations.

The desired compressor flow $\dot{m}_C^{des}$ can now be calculated as:

(1)

$$\dot{m}_C^{des} = \begin{cases} \dot{m}_{eng,air}^{@des\ Boost} & , \text{non-torque based} \\ \text{MIN}(\dot{m}_{eng,air}^{des}, \dot{m}_{eng,air}^{@Max\ des\ Boost}) & , \text{torque based} \end{cases}$$

where $\dot{m}_C^{des}$ is the desired compressor mass flow rate; $\dot{m}_{eng,air}^{des}$ is the desired engine air mass flow rate from the torque control structure; and $\dot{m}_{eng,air}^{des\ Boost}$ is the desired engine air mass flow rate at the desired boost pressure level; and $\dot{m}_{eng,air}^{@Max\ des\ Boost}$ is the desired engine air mass flow rate at the maximum desired boost pressure level.

It is noted that the above calculation assumes that all engine airflow will flow through the compressor. If there are other air sources, e.g. IAC valve airflow or purge airflow, they should naturally be accounted for in equation (1).

The desired compressor pressure ratio is calculated as:

(2a) $P_{C,out}^{des} = P_{Boost}^{des} + \Delta P_{Intercooler}$ where $P_{C,out}^{des}$ is the desired compressor outlet stagnation pressure; $P_{Boost}^{des}$ is the desired boost pressure (after intercooler, before throttle); and $\Delta P_{Intercooler}$ is the intercooler pressure drop.

(2b) $P_{C,in} = P_{amb} - \Delta P_{Airfilter}$ where $P_{C,in}$ is the compressor inlet stagnation pressure; $P_{amb}$ is the ambient pressure; and $\Delta P_{Airfilter}$ is the air filter pressure drop.

(2c)

$$Pr_C^{des} = \frac{P_{C,out}^{des}}{P_{C,in}}$$

where $Pr_C^{des}$ is the desired compressor pressure ratio; $P_{C,out}^{des}$ is the desired compressor outlet stagnation pressure; and $P_{C,in}$ is the compressor inlet stagnation pressure.

The desired compressor power $P_C^{des}$ is calculated as:

(3a)

$$\dot{V}_{C,cor}^{des} = \dot{m}_C^{des} * \frac{T_{C,in} R}{P_{C,in}} * \sqrt{\frac{T_{C,in}^{reference}}{T_{C,in}}}$$

where $\dot{V}_{C,cor}^{des}$ is the desired corrected compressor volume flow rate; $\dot{m}_C^{des}$ is the desired compressor mass flow rate; $T_{C,in}$ is the compressor inlet air stagnation temperature; R is the gas constant; $P_{C,in}$ is the compressor inlet stagnation pressure; and $T_{C,in}^{reference}$ is the reference compressor inlet air stagnation temperature (from turbo manufacturers data).

(3b) $\dot{N}_{T,cor}^{des} = \text{Table2}(\dot{V}_{C,cor}^{des}, Pr_C^{des})$ where $\dot{N}_{T,cor}^{des}$ is the desired corrected turbo-charger rotational speed; $\dot{V}_{C,cor}^{des}$ is the desired corrected compressor volume flow rate; and $Pr_C^{des}$ is the desired compressor pressure ratio.

(3c) $\Delta h_C^{des} = \text{Table1}(\dot{V}_{C,cor}^{des}, \dot{N}_{T,cor}^{des})$ where $\Delta h_C^{des}$ is the desired compressor enthalpy delta; $\dot{V}_{C,cor}^{des}$ is the desired corrected compressor volume flow rate; and $\dot{N}_{T,cor}^{des}$ is the desired corrected turbo-charger rotational speed.

(3d) $P_C^{des} = \dot{m}_C^{des} * \Delta h_C^{des}$ where $P_C^{des}$ is the desired power absorbed by compressor; $\dot{m}_C^{des}$ is the desired compressor mass flow rate; and $\Delta h_C^{des}$ is the desired compressor enthalpy delta.

During real-time execution by the electronic controller 14, the dependencies in the above equations (3a) through (3d) are evaluated.

First, equation (3a) is evaluated to obtain a value for the desired corrected volume flow rate $\dot{V}_{C,cor}^{des}$. The dependencies in the right hand side of equation (3a) can be met either through direct sensor measurement or via estimation. For example, $T_{C,in}^{reference}$ and R will be known, $T_{C,in} \approx T_{amb}$ will be known via measurement by intake air temperature (IAT) sensor 54, $P_{C,in}$ will be known via measurement by ambient pressure sensor 50 ($P_{amb}$) as modified by $\Delta P_{Airfilter}$ (i.e., using equation (2b)), and the desired compressor flow $\dot{m}_C^{des}$ will be known via prior evaluation of equation (1). It should be understood that the pressure drops across the air filter 28 and intercooler 30, $\Delta P_{Airfilter}$ and $\Delta P_{Intercooler}$ respectively, may be empirically determined by characterizing such pressure drops as a function of engine flow.

Next, equation (3b) is evaluated to obtain a value for the desired corrected turbo rotational speed ($\dot{N}_{T,cor}^{des}$). The inputs needed for use of the corrected rotational speed data table 74 ("Table2") are the desired corrected volume flow rate $\dot{V}_{C,cor}^{des}$, which can be calculated from equation (3a) and the desired compressor pressure ratio $Pr_C^{des}$, which can be calculated from equation (2c). The compressor inlet pressure $P_{C,in}$ in has already been calculated in evaluating equation (2b). The desired compressor outlet pressure $P_{C,out}^{des}$ may be determined using equation (2a). The desired compressor pressure ratio $Pr_C^{des}$ is then calculated, thus allowing equation (3b) to be evaluated to obtain a value for the desired, corrected rotational speed $\dot{N}_{T,cor}^{des}$.

Next, equation (3c) is evaluated to obtain a value for the desired compressor enthalpy delta $\Delta h_C^{des}$, using the just-determined values for $\dot{V}_{C,cor}^{des}$ and $\dot{N}_{T,cor}^{des}$.

Finally, equation (3d) is evaluated, using the value of the desired compressor enthalpy delta $\Delta h_C^{des}$ and the desired mass flow rate $\dot{m}_C^{des}$, to obtain a value of the desired power absorbed by the compressor $P_C^{des}$.

The desired turbine flow $\dot{m}_T^{des}$ is calculated as:

(4) $\eta_T = \text{Table3}(Pr_T)$ where $\eta_T$ is the turbine isentropic efficiency and $Pr_T$ is the turbine pressure ratio.

(5)

$$A^{des} = \left( \frac{P_C^{des}}{\eta_T c_p^e T_{T,in}} \right), B^{des} = B = \frac{\sqrt{T_{T,in}}}{P_{T,out}}$$

where $A^{des}$ is the desired turbo power term and (12a)

$$\dot{m}_{WG}^{des@\,SonicStdCond} = \dot{m}_{WG}^{des} \frac{P_{std}}{P_{EM}^{des}} \sqrt{\frac{T_{EM}}{T_{std}}} \frac{1}{\beta_2(1/Pr_T^{des})}$$

$$A = \left(\frac{P_C}{\eta_T c_p^e T_{T,in}}\right)$$

is the turbo power term; $B^{des}$ is the desired turbine boundary term; and where $\dot{m}_{WG}^{des@\,SonicStdCond}$ is desired waste-gate mass flow rate at standard sonic conditions; $\dot{m}_{WG}^{des}$ is the desired waste-gate mass flow rate; $P_{std}$ is a Standard Pressure (a defined reference); $T_{std}$ is a Standard Temperature (a defined reference); $P_{EM}^{des}$ is the desired exhaust manifold stagnation pressure; $T_{EM}$ is the exhaust manifold gas stagnation temperature; $\beta_2$ is the normalized valve flow dependency on pressure ratio for compressible fluid; and $Pr_T^{des}$ is the desired turbine pressure ratio.

$$B = \frac{\sqrt{T_{T,in}}}{P_{T,out}}$$

is the turbine boundary term.

(6) $\dot{m}_{T,cor}^{des} = \text{Table5}(A^{des} * B^{des})$ where $\dot{m}_{T,cor}^{des}$ is the desired corrected turbine mass flow rate; $A^{des}$ is the desired turbo power term; and $B^{des}$ is the desired turbine boundary term.

(12b)

$$tmp(Pr) = \sqrt{\frac{2}{k-1}} \sqrt{(Pr)^{2/k} - (Pr)^{(k+1)/k}}$$

(7)

$$\dot{m}_T^{des} = \dot{m}_{T,cor}^{des} \frac{P_{T,out}}{\sqrt{T_{T,in}}}$$

where tmp(Pr) is a temporary variable used in equation (12b) to allow for easier substitution in equation (12d);

(12c)

$$Pr_{crit} = \left(\frac{2}{k+1}\right)^{k/(k-1)}$$

where $\dot{m}_T^{des}$ is the desired turbine mass flow rate; $\dot{m}_{T,cor}^{des}$ is the desired corrected turbine mass flow rate; $P_{T,out}$ is the turbine outlet stagnation pressure; and $T_{T,in}$ is the turbine inlet stagnation temperature.

The desired turbine pressure ratio $Pr_T^{des}$ and turbine inlet $P_{EM}^{des}$ and outlet $P_{T,out}^{des}$ pressures are calculated as:

(8) $Pr_T^{des} = \text{Table4}(\dot{m}_{T,cor}^{des})$ where $Pr_T^{des}$ is the desired turbine pressure ratio and $\dot{m}_{T,cor}^{des}$ is the desired corrected turbine mass flow rate.

where $Pr_{crit}$ is the critical pressure ratio;

(12d)

$$\beta_2 = \begin{cases} 1 & , \text{ for } Pr <= Pr_{crit} \\ \frac{tmp(Pr)}{tmp(Pr_{crit})} & , \text{ for } Pr > Pr_{crit} \end{cases}$$

(9a)

$$tmp^{des} = \frac{\dot{m}_{exh}^{des}\sqrt{R*T_{T,out}}}{P_{amb}*\text{Calibration 1}}$$

where $\beta_2$ is the normalized valve flow dependency on pressure ratio for compressible fluid and $Pr_{crit}$ is critical pressure ratio;

and where Beta2 ($\beta_2$) is the normalized effect of pressure ratio (Pr) on valve flow of a compressible fluid (gas), and is detailed in equations (12b)-(12d) above. Its deduction is e.g., given in Appendix C, John B. Heywood, "Internal Combustion Engine Fundamentals," ISBN P-070100499-8, herein incorporated by reference in its entirety. For its use for waste-gate flow, the ratio of specific heats for exhaust gas should be used, $k=k_{exh}=1.33$. For real time implementations, the Beta2 ($\beta_2$) parameter should be tabulated in advance (i.e., as opposed to real time calculation).

where $tmp^{des}$ is a temporary variable used in equation (9a) to allow easier substitution into equation 9(b); $\dot{m}_{exh}^{des}$ is the desired exhaust system mass flow rate; R is the gas constant; $T_{T,out}$ is the turbine outlet stagnation temperature; and $P_{amb}$ is the ambient pressure.

(9b) $P_{T,out}^{des} = P_{amb} * \text{Table4}(tmp^{des})$ where $P_{T,out}^{des}$ is the desired turbine outlet stagnation pressure; $P_{amb}$ is the ambient pressure; and $tmp^{des}$ is the temporary variable referred to above in connection with equation (9a).

(10) $P_{EM}^{des} = P_{T,in}^{des} = Pr_T^{des} * P_{T,out}^{des}$ where $P_{EM}^{des}$ is the desired turbine outlet stagnation pressure; $P_{T,in}^{des}$ is the desired turbine inlet stagnation pressure; $Pr_T^{des}$ is the desired turbine pressure ratio; and $P_{T,out}^{des}$ is the desired turbine outlet stagnation pressure.

For the pneumatic waste-gate mechanizations 100 and 108, the desired delta pressure across the waste-gate is the same as the desired delta pressure across the turbine:

(13) $\Delta P_{WG}^{des} = \Delta P_T^{des} = P_{EM}^{des} - P_{T,out}^{des}$ where $\Delta P_{WG}^{des}$ is the desired waste-gate valve delta pressure; $\Delta P_T^{des}$ is the desired turbine delta pressure; $P_{EM}^{des}$ is the desired exhaust manifold stagnation pressure; and $P_{T,out}^{des}$ is the desired turbine outlet stagnation pressure.

The desired waste-gate mass flow $\dot{m}_{WG}^{des}$ and desired waste-gate mass flow at sonic standard conditions $\dot{m}_{WG}^{des@SonicStdCond}$ are calculated as:

(11) $\dot{m}_{WG}^{des} = \dot{m}_C^{des} - \dot{m}_T^{des}$ where $\dot{m}_{WG}^{des}$ is the desired waste-gate mass flow rate; $\dot{m}_C^{des}$ is the desired compressor mass flow rate; and $\dot{m}_T^{des}$ is the desired turbine mass flow rate.

FIG. 3 shows the physical linkage between the waste-gate valve delta pressure $\Delta P_{WG}$ and the waste-gate diaphragm delta pressure $\Delta P_{WG,Dphr}$. The position of the waste-gate valve 24 is the result of the force balance across the waste-gate valve linkage. The force on one side is generated by the delta pressure across the waste-gate valve $\Delta P_{WG}$. The counteracting force is generated by the delta pressure across the waste-gate actuation diaphragm $\Delta P_{WG,Dphr}$. A given force balance results in a given position of the waste-gate valve 24, which position is equivalent to an effective flow area. The effective flow area in turn can be converted to a waste-gate valve flow at sonic standard conditions. This means that a unique calibration can be created which describes the desired waste-gate diaphragm delta pressure $\Delta P_{WG,Dphr}^{des}$ as a function of desired waste-gate valve flow at sonic standard conditions $\dot{m}_{WG}^{des@SonicStdCond}$ and desired waste-gate delta pressure $\Delta P_{WG}^{des}$.

(14) $\Delta P_{WG,Dphr}^{des,base}$=TableC1($\dot{m}_{WG}^{des@SonicStdCond}$, $\Delta P_{WG}$) where $\Delta P_{WG,Dphr}^{des,base}$ is the desired waste-gate diaphragm delta pressure, base look-up; $\dot{m}_{WG}^{des@SonicStdCond}$ is the desired waste-gate mass flow rate at standard sonic conditions; and $\Delta P_{WG}^{des}$ is the desired waste-gate valve delta pressure.

Furthermore, boost control transient response may be improved further by adding a transient term calibrated as a function of boost control error:

(15) $\Delta P_{WG,Dphr}^{des,TransientTerm}$=TableC2($P_{Boost}$-$P_{Boost}^{des}$) where $\Delta P_{WG,Dphr}^{des,TransientTerm}$ is the desired waste-gate diaphragm delta pressure, transient term; $P_{Boost}$ is the boost pressure (after intercooler, before throttle); and $P_{Boost}^{des}$ is the desired Boost Pressure (after intercooler, before throttle).

Where transient response improvement term table 124 ("TableC2") should be calibrated to zero for zero boost control error ($P_{Boost}$-$P_{Boost}^{des}$=0).

When adding a closed-loop correction term $\Delta P_{WG,Dphr}^{des,CL}$ for robustness to calibration and model inaccuracies, it should be applied to $\Delta P_{WG,Dphr}^{des}$.

(16) $\Delta P_{WG,Dphr}^{des}$=$\Delta P_{WG,Dphr}^{des,CL}$+$\Delta P_{WG,Dphr}^{des,CL}$+$\Delta P_{WG,Dphr}^{des,TransientTerm}$ where $\Delta P_{WG,Dphr}^{des}$ is the desired waste-gate diaphragm delta pressure; $\Delta P_{WG,Dphr}^{des,base}$ is the desired waste-gate diaphragm delta pressure, base look-up; $\Delta P_{WG,Dphr}^{des,CL}$ is the desired waste-gate diaphragm delta pressure, closed-loop term; and $\Delta P_{WG,Dphr}^{des,TransientTerm}$ is the desired waste-gate diaphragm delta pressure, transient term.

As to the waste-gate mechanization 100 (FIG. 3), it can be seen that the desired waste-gate diaphragm delta pressure $\Delta P_{WG,Dphr}^{des}$ can be converted into the desired waste-gate solenoid delta pressure $\Delta P_{WG,S\ In\ d}^{des}$ by:

(17) $\Delta P_{WG,S\ In\ d}^{des}$=$P_{Boost}^{des}$-$P_{amb}$-$\Delta P_{WG,Dphr}^{des}$ where $\Delta P_{WG,S\ In\ d}^{des}$ is the desired waste-gate solenoid delta pressure; $P_{Boost}^{des}$ is the desired Boost Pressure (after intercooler, before throttle); $P_{amb}$ is the ambient pressure; and $\Delta P_{WG,Dphr}^{des}$ is the desired waste-gate diaphragm delta pressure.

The relationship between the solenoid duty cycle, its upstream pressure and delta pressure can be tabulated, and thus used to look-up the waste-gate solenoid duty cycle DutyCycle$_{WG,S\ In\ d}$:

(18) DutyCycle$_{WG,S\ In\ d}$=TableC3($\Delta P_{WG,S\ In\ d}^{des}$, $P_{Boost}$) where DutyCycle$_{WG,S\ In\ d}$ is the waste-gate solenoid commanded duty-cycle; $\Delta P_{WG,S\ In\ d}^{des}$ is the desired waste-gate solenoid delta pressure; and $P_{Boost}$ is the boost pressure (after intercooler, before throttle).

As to the waste-gate mechanization 108 (FIG. 4), when using a vacuum source (pump) to actuate the waste-gate diaphragm, equation (19a) defines the relationship:

$$\Delta P_{WG,S\ In\ d}^{des}=P_{vac}-P_{amb}-\Delta P_{WG,Dphr}^{des} \qquad (19a)$$

where $\Delta P_{WG,S\ In\ d}^{des}$ is the desired waste-gate solenoid delta pressure; $P_{vac}$ is the pressure of the vacuum source; $P_{vac}$ is the ambient pressure; and $\Delta P_{WG,Dphr}^{des}$ is the desired waste-gate diaphragm delta pressure.

The relationship between the solenoid duty cycle, its upstream pressure and delta pressure can be tabulated, and thus used to look-up the waste-gate solenoid duty cycle DutyCycle$_{WG,S\ In\ d}$ as set forth in equation (19b).

$$\text{DutyCycle}_{WG,S\ In\ d}=\text{TableC4}(\Delta P_{WG,S\ In\ d}^{des},P_{vac}) \qquad (19b)$$

where DutyCycle$_{WG,S\ In\ d}$ is the waste-gate solenoid commanded duty-cycle; $\Delta P_{WG,Dphr}^{des}$ is the desired waste-gate diaphragm delta pressure; and $P_{vac}$ is the pressure of the vacuum source.

For a constant vacuum, equation (19b) may be simplified into equation (19c):

(19c) DutyCycle$_{WG,S\ In\ d}$=TableC4($\Delta P_{WG,Dphr}^{des}$) where DutyCycle$_{WG,S\ In\ d}$ is the waste-gate solenoid commanded duty-cycle and $\Delta P_{WG,Dphr}^{des}$ is the desired waste-gate diaphragm delta pressure.

As to the waste-gate mechanization 114 (FIG. 5) based on an electric motor-controlled waste-gate valve, a tabulated waste-gate valve flow characteristic is used to convert the desired waste-gate valve flow at sonic standard conditions $\dot{m}_{WG}^{des@SonicStdCond}$ into a desired valve position:

(20) ValvePos$_{WG}^{des}$=TableC5($\dot{m}_{WG}^{des@SonicStdCond}$) where ValvePos$_{WG}^{des}$ is the desired waste-gate valve position and $\dot{m}_{WG}^{des@SonicStdCond}$ is the desired waste-gate mass flow rate at standard sonic conditions.

Finally, it is noted that the model based controls approach also works for engine with both waste-gate and VGT by simply adding the VGT position dependency to tables 76, 78 and 80 (i.e., "Table3", "Table4" and "Table5").

It should be appreciated that a model form as described above allows for an explicit one-step through calculation of the desired waste-gate flow and delta pressure from the desired boost pressure. This one-step through ("loop") solvability makes it suitable for real-time systems, as opposed to iterative approaches which are too resource intensive to be implemented in practical, real time systems. Additionally, this model form ensures good transient boost response, because it is based on predictive states (as opposed to actual).

A description detailing how to populate estimation model data tables 74-84 will now be set forth.

It is common practice for manufacturers of turbo-chargers to make the following data available: $\dot{V}_{C,cor}$, $Pr_C$, $\dot{N}_{T,cor}$, $\eta_C$ at a specified $T_{C,in}^{reference}$, $P_{C,in}^{reference}$, where $\dot{V}_{C,cor}$ is the corrected compressor volume flow rate, $\dot{N}_{T,cor}$ is the corrected turbo-charger rotational speed and $T_{C,in}^{reference}$, $P_{C,in}^{reference}$ are the reference compressor inlet air stagnation temperature and reference compressor inlet air stagnation pressure, respectively. This data is what is referred to herein as the compressor characteristics map. While one of ordinary skill in the art will understand the form of the data commonly available, for the sake of clarity, and for example purposes only, a turbo-charger manufacturer may provide a map/diagram that graphically illustrates the compressor isentropic efficiency $\eta_C$ (e.g., as rings or partial rings indicating various efficiency levels such as 50%, 60%, 70%, 72%, 75%, etc.) on an X-Y chart where the X-axis is the corrected volume (air) flow rate and the Y-axis is the compressor pressure ratio. Overlaying the efficiency level rings may be a series of traces, generally offset from each other, with each indicating a respective turbo-charger corrected speed. It should be understood, however, that other forms of data or information may be available, including without limitation data in electronic format. Moreover, while it is preferred, due to convenience primarily, that such manufacturer-provided data concerning the compressor be used, it should be understood that independent measurements and characterization of the compressor of a turbo-charger may be employed to obtain the same information as described above, without any limitation of the present invention.

The values in tables 72 and 74 ("Table1" and "Table2" in the equations) are preferably calculated and stored in advance of real-time execution by electronic controller 14. Specifically, both tables 72 and 74 may be populated in advance using the compressor characteristic map.

The compressor enthalpy delta ($\Delta h_C$) table 72 ("Table1") is a table that takes as inputs the corrected compressor volume flow rate ($\dot{V}_{C,cor}$) and the corrected turbo-charger rotational speed ($\dot{N}_{T,cor}$) and provides as an output a value for the compressor enthalpy delta (i.e., change in enthalpy of the gas across the compressor), in the form of equation (T1) below:

$$\Delta h_C = \text{Table1}(\dot{V}_{C,cor}, \dot{N}_{T,cor}) \tag{T1}$$

Table 72 may be populated using the data conventionally available from the turbo manufacturers characterizing the compressor, as well as the following equation (T2):

$$\Delta h_C = \frac{1}{\eta_C} c_{p,air} T_{C,in} [(Pr_C)^{((k_{air}-1)/k_{air})} - 1] \tag{T2}$$

The corrected turbo-charger rotational speed ($\dot{N}_{T,cor}$) table 74 is a table that takes as inputs the corrected compressor volume flow rate ($\dot{V}_{C,cor}$) and the compressor pressure ratio ($Pr_C$), and provides as an output the corrected turbo-charger rotational speed ($\dot{N}_{T,cor}$), as in the form of equation (T3) below:

$$\dot{N}_{T,cor} = \text{Table2}(\dot{V}_{C,cor}, Pr_C) \tag{T3}$$

Table 74 may be populated by using the data conventionally available from the turbo manufacturer characterizing the compressor.

Figure 7:
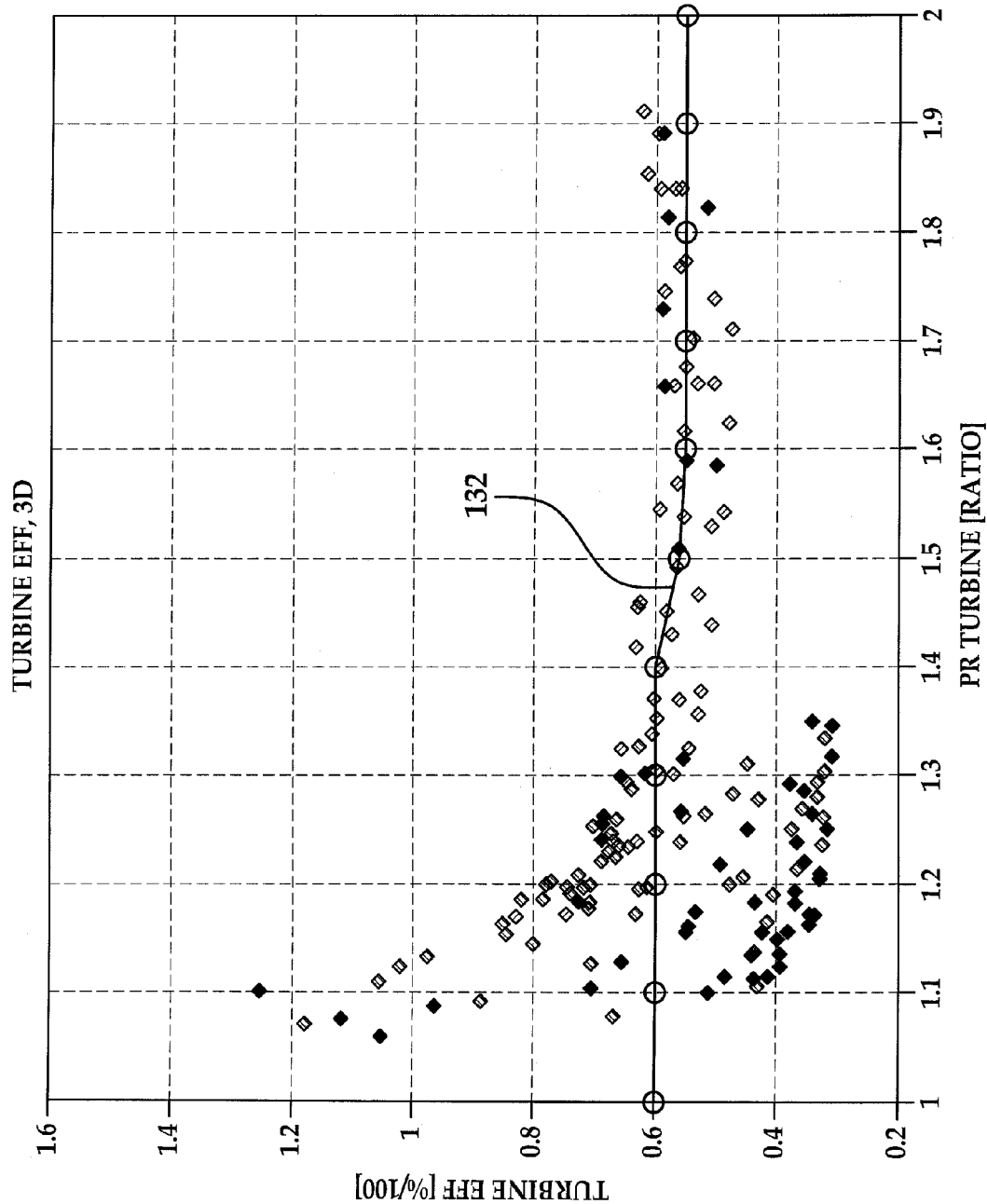
FIG. 7 is a diagram showing turbine isentropic efficiency as a function of turbine pressure ratio.

FIG. 7 is a chart showing turbine isentropic efficiency as a function of turbine pressure ratio, as observed in several turbo-charged engines. FIG. 7 shows that a simple model of the turbine isentropic efficiency $\eta_T$ is adequate for the present invention. Table 76("Table3") is preferably calculated and stored in advance of real-time execution by electronic controller 14, and takes the form as set forth below in equation (T4):

$$\eta_T = \text{Table3}(Pr_T) \tag{T4}$$

The data for table 76 ("Table3") is preferably populated as follows. In one embodiment, the data for table 76 ("Table3") may be obtained by the indirect measurement of turbine isentropic efficiency $\eta_T$ from equation (T5) below, by obtaining 1) measurements of $T_{C,in}$, $T_{T,in}$, $P_{C,in}$, $P_{C,out}$, $P_{T,in}$, $P_{T,out}$, $\dot{m}_C$; 2) $\dot{m}_T$ from the indirect method described below in the section "Turbine and waste-gate flow indirect measurement methods"; and 3) $\eta_C$ from reference to the compressor characteristics data provided by the turbo manufacturer. Additionally, the turbine pressure ratio $Pr_T$ may be calculated from measurements of $P_{T,in}$, $P_{T,out}$. Trace 132 is exemplary of the data that may populate the data table.

$$\eta_T = \frac{1}{\eta_C} \frac{\dot{m}_C}{\dot{m}_T} \frac{c_{p,air}}{c_{p,exh}} \frac{T_{C,in}}{T_{T,in}} \frac{[(Pr_C)^{((k_{air}-1)/k_{air})} - 1]}{[1 - (Pr_T)^{((k_{exh}-1)/k_{exh})}]} \tag{T5}$$

Figure 8:
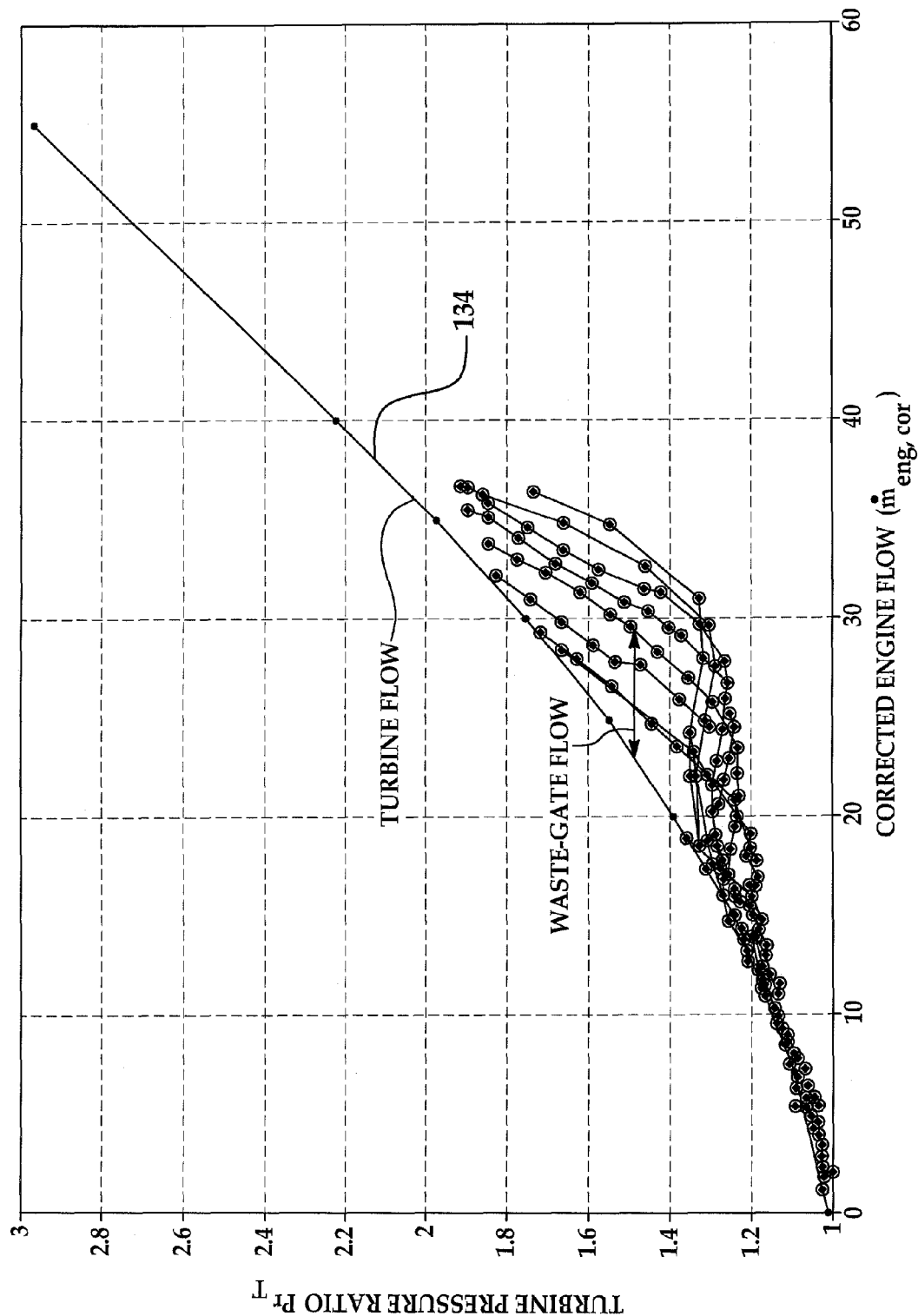
FIG. 8 is a diagram showing turbine pressure ratio as a function of corrected engine flow.

FIG. 8 is a chart showing turbine pressure ratio $Pr_T$ as a function of corrected engine flow. The following empirical relationship (i.e., equations (T6) and (T7)) for a turbine shown in FIG. 8 was found in Müller, M., et al., "Mean Value Modeling of Turbocharged Spark Ignition Engines", Society of Automotive Engineers (SAE) Technical Paper, no. 980784, International Congress and Exposition, Detroit, Mich., USA, Feb. 23-26, 1998, incorporated by reference herein in its entirety.

$$Pr_T = \text{Table4}(\dot{m}_{T,cor}) \tag{T6}$$

Where $$\dot{m}_{T,cor} = \dot{m}_T \frac{\sqrt{T_{T,in}}}{P_{T,out}} \tag{T7}$$

The pressure ratio/corrected engine flow data table 78 (i.e., the "Table4" in equation (T6)) may be populated with values in advance of real-time execution by electronic controller 14 using measurements of $P_{T,in}$, $P_{T,out}$, $T_{T,in}$ where $\dot{m}_T = \dot{m}_{eng}$ is used for all data points where the waste-gate and EGR valve are closed. More specifically, first measuring $P_{T,in}$, $P_{T,out}$, $T_{T,in}$ and $\dot{m}_{eng}$ test data. Then generating a first set of datapairs for turbine pressure ratio ($Pr_T$) and corrected engine mass flow rate ($\dot{m}_{eng,cor}$) using the measured test data. This would involve converting measured $\dot{m}_{eng}$ to $\dot{m}_{eng,cor}$ using the form of equation (T7) but substituting engine flow rate for turbine flow rate. Then, generating a second set of data-pairs for turbine pressure ratio ($Pr_T$) and corrected turbine mass flow rate ($\dot{m}_{T,cor}$) from the first set of data pairs wherein the second set of data-pairs is indicative of conditions where the waste-gate valve would be closed. And finally, populating the data table 78 ("Table4") with the second set of data-pairs. Such conditions would include the values for the turbine pressure ratio ($Pr_T$), for a given corrected turbine mass flow rate ($\dot{m}_{T,cor}$) would always be equal to or greater than the turbine pressure ratio ($Pr_T$) for the same value $\dot{m}_{eng,cor}$ (i.e., from the first set of data pairs). One would understand that this data in table 78 represent a smooth and continuous shape (e.g., as shown as trace 134 in FIG. 8).

Equation (T8) is set forth below:

$$\left(\frac{P_C}{\eta_T c_p^e T_{T,in}}\right) * \left(\frac{\sqrt{T_{T,in}}}{P_{T,out}}\right) = \dot{m}_{T,cor}[1 - (Pr_T)^{((k_{exh}-1)/k_{exh})}] \tag{T8}$$

Two new variables A, B are introduced, as set forth in equation (T9) below.

$$A = \left(\frac{P_C}{\eta_T c_p^e T_{T,in}}\right), \quad B = \frac{\sqrt{T_{T,in}}}{P_{T,out}} \tag{T9}$$

Where A is a Turbo Power Term; and
B is a Turbine Boundary Term.

Substituting new variables A and B of equation (T9) into equation (T8) results in a rewritten equation, designated as equation (T10) below:

$$A*B = \dot{m}_{T,cor}[1 - (Pr_T)^{((k_{exh}-1)/k_{exh})}] \tag{T10}$$

Equation (T6), making use of data table 78 ("Table4"), shows that there is a unique relationship between $\dot{m}_{T,cor}$ and $Pr_T$, and equation (T10) therefore stands for the proposition that a given product (A*B) describes one such unique combination of $\dot{m}_{T,cor}$ and $Pr_T$. It is therefore possible to directly tabulate the relationship between (A*B) and $\dot{m}_{T,cor}$ in a further table, namely turbine power and boundary term data table 80 ("Table5"), the form of which is set forth in equation (T11) below.

$$\dot{m}_{T,cor} = \text{Table5}(A*B). \quad (T_{11})$$

Table 80 ("Table5") may be populated with values in advance of real-time execution by controller 14 (i.e., can be calculated off-line) using data table 78 ("Table4"), by calculating $Pr_T$ from equation (T6) using an array of $\dot{m}_{T,cor}$ and then calculating the corresponding (A*B) values from equation (T10).

Turbine and Waste-Gate Flow Indirect Measurement Methods

FIG. 8 and equation (T6) describe the relationship between $Pr_T$ and $\dot{m}_{T,cor}$, which is calibrated for the data points when the waste-gate valve (e.g., waste-gate valve 24 in FIG. 1) is closed. The data points for an open waste-gate valve, however, will deviate from this calibration. Inverting equation (T6), gives equation (T12) below.

$$\dot{m}_T^{cor} = \text{Table4}^{-1}(Pr_T) \quad (T12)$$

Equation (T7) may be used to convert $\dot{m}_{T,cor}$ to $\dot{m}_T$. A value for $\dot{m}_T$ may then be used to obtain the waste-gate valve flow rate $\dot{m}_{WG} = \dot{m}_{exh} - \dot{m}_T$ where $\dot{m}_{exh} = \dot{m}_{eng} - \dot{m}_{EGR}$.

The pressure drop data table 82 ("Table6"), contains predetermined data characterizing the pressure drop characteristics of catalyst/muffler restriction 38 as a function of flow. $P_{T,out}$ is assumed known as this may be described by conventional models of the pressure drop across the catalyst and muffler, which opens to atmosphere (i.e., the ambient pressure at tailpipe exit opening 40—best shown in FIG. 1). For completeness, equations (T13a) and (T13b) below may be used by electronic controller 14 to produce a value for the turbine outlet pressure $P_{T,out}$.

$$tmp = \frac{\dot{m}_{exh}\sqrt{R*T_{T,out}}}{P_{amb}*\text{Calibration 1}} \quad (T13a)$$

$$P_{T,out} = P_{amb}*\text{Table 6}(tmp) \quad (T13b)$$

Where tmp is a temporary variable, and

Calibration1 is a scaling calibration value selected so that the variable "tmp" is within the bounds or limits established for Table6.

Part of the exhaust gas flows through the turbine across which the temperature drops as the expansion process is converted into absorbed power of the turbine. The other part of the exhaust gas which flows through the waste-gate path does not experience a temperature drop due to expansion-work. Furthermore, due to the high flows and turbulence levels in the turbine and waste-gate path, a temperature drop is caused by convective heat transfer to the turbine and waste-gate housing. Therefore the model for the turbine outlet temperature is a mixing model of the outlet temperatures from the turbine and waste-gate plus the heat transfer model, expressed in equations (T14a), (T14b) and (T14c) below:

$$tmp = 1 - \eta_T\left(1 - \left(\frac{P_{T,out}}{P_{T,in}}\right)^{((k_{exh}-1)/k_{exh})}\right) \quad (T14a)$$

$$T_{T,out,w/oHT} = T_{T,in}*\left(tmp\frac{\dot{m}_T}{\dot{m}_{exh}} + \frac{\dot{m}_{WG}}{\dot{m}_{exh}}\right) \quad (T14b)$$

$$T_{T,out} = T_{amb} - (T_{amb} - T_{T,out,w/oHT})\text{Table 7}(\dot{m}_{exh}) \quad (T14c)$$

Where tmp is a temporary variable, and

"Table7" corresponds to heat transfer calibration data table 84.

Heat transfer calibration data table 84 is preferably populated with data in advance of real time execution by controller 14. Table 84 ("Table7") may be populated by obtaining; 1) measurements of: $T_{amb}$, $T_{T,in}$, $T_{T,out}$, $P_{T,in}$, $P_{T,out}$, $\dot{m}_{exh}$; 2) $\dot{m}_T$, $\dot{m}_{WG}$ from the methods described in the section "Turbine and waste-gate flow indirect measurement methods"; 3) $\eta_T$ either from method described in the section "Turbine isentropic efficiency indirect measurement method" or set as a reasonable constant value, e.g. 55%. Rearranging equations (T14a)-(T14c) in order to isolate "Table7", the value of Table7 can be calculated for each data point based on the data gathered, as described above in this paragraph in 1), 2) and 3). Table 84 ("Table7") can now be tabulated with that data. In sum, the heat transfer data in table 84 ("Table7") may be calibrated by fitting the model to the measured $T_{T,out}$ or a reasonable, constant value of $\eta_T$ may be used.

A description detailing how to populate data tables 122-130 ("TableC1" through "TableC5") will now be set forth.

Figure 9:
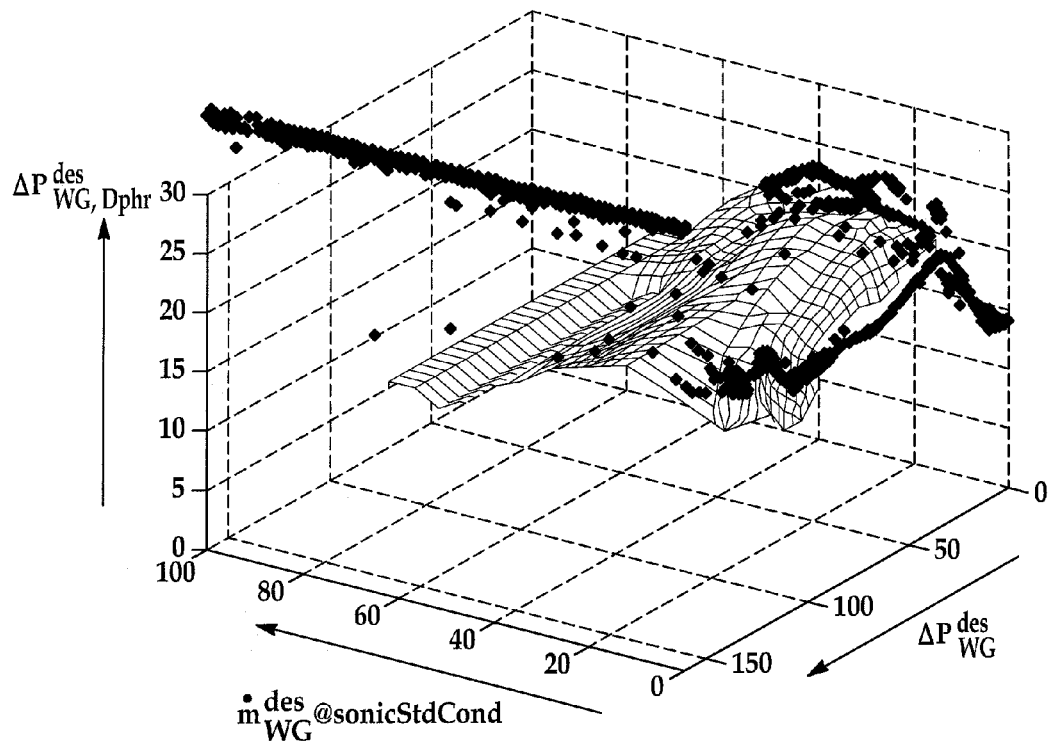
FIG. 9 is a chart of data in a data table showing the desired waste-gate diaphragm delta pressure.

FIG. 9 shows graphically an example of the data table 122 (37 TableC1"). The desired waste-gate diaphragm delta pressure data table 122 ("TableC1") may be populated in either of two ways. The first uses steady-state data that may be collected already for the calibration of the estimation model data tables 74-84 as described above. This is done by additionally measuring $\Delta P_{WG,Dphr}$ and $\Delta P_{WG} = \Delta P_T = P_{EM} - P_{T,out}$, and by indirectly measuring $\dot{m}_{WG}$ by the method described above in the section "Turbine and waste-gate flow indirect measurement methods". The conversion from $\dot{m}_{WG}$ to $\dot{m}_{WG}^{@SonicStdCond}$ is described above by equation (12). With the foregoing data measured (directly or indirectly), the table 122 ("TableC1") may now be tabulated in the form of $\Delta P_{WG,Dphr} = \text{TableC1}(\dot{m}_{WG}^{@SonicStdCond}, \Delta P_{WG})$.

The other way of calibrating table 122 ("TableC1") is during actual engine operation, and is to change the values of $\Delta P_{WG,Dphr}$ in table 122 ("TableC1") until $\dot{m}_{WG}$ matches $\dot{m}_{WG}^{des}$.

Populating the table 124 ("TableC2") with data may be done during calibration fine tuning while performing transient maneuvers to obtain improved response without overshoot.

Figure 10:
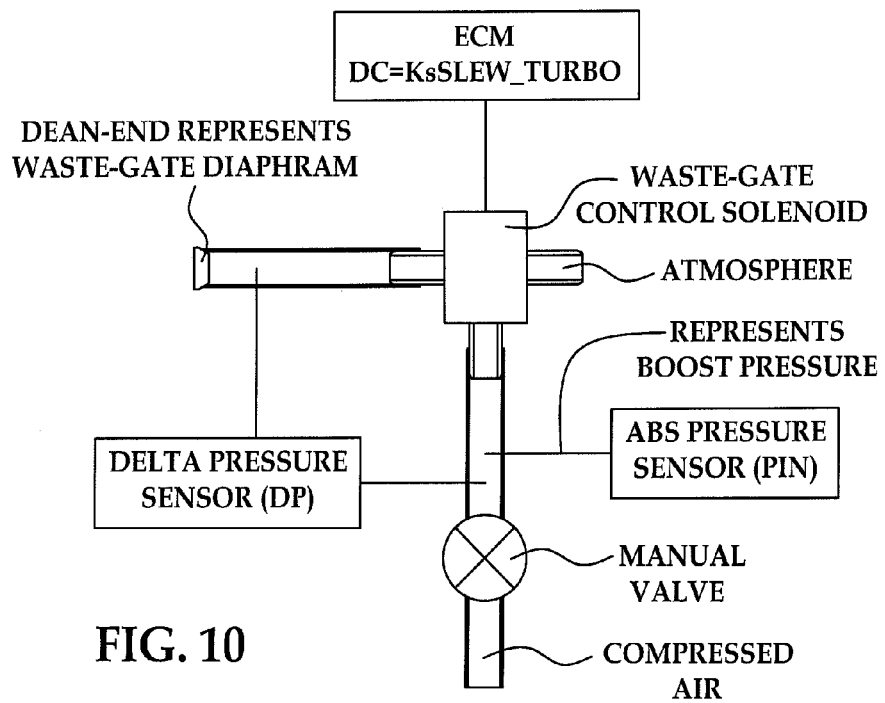
FIG. 10 is a diagrammatic view showing a calibration setup for obtaining data for a duty cycle data table.

The data table 126 ("TableC3"), which is the calibration of the solenoid characteristics, may be performed without the engine running. The form is given as follows: $\text{DutyCycle}_{WG,S\ In\ d} = \text{TableC3}(\Delta P_{WG,S\ In\ ddes}, P_{Boost})$. The setup to characterize the solenoid valve as shown in FIG. 10. The operation of the valve may cause substantial pressure fluctuations, making accurate pressure measurement difficult. If so, one may add simple damper volumes. By adjusting the manual valve, one may reduce the compressed air source to a desired $P_{Boost}$ breakpoint (i.e., this is Pin in the FIG. 10). Then, change the waste-gate control solenoid duty cycle (i.e., this is DC in the FIG. 10) and log the delta pressure (dP). Data should be taken with a sufficiently fine solution since the surface is fairly non-linear. Finally, the captured data is inverted to fit the calibration format of table 126 ("TableC3"). Thus, the first step involves measuring data in the format as follows: dP=f(Pin, DC). The next step involves inverting the captured data into the data format of the data table 126, as follows: DC=f(dP, Pin).

The data table 128 ("TableC4") may be populated with data as follows. First, for a constant vacuum, measure $\Delta P_{WG,Dphr}$ versus $DutyCycle_{WG,S\ In\ d}$ and record the data. Then use the recorded data to populate the data table 128 ("TableC4"). Alternatively, if a variable pressure vacuum source is used, measure $\Delta P_{WG,Dphr}$ versus $DutyCycle_{WG,S\ In\ d}$ and $P_{vac}$, and then record the data. A setup and approach similar to that used for data table 126 ("TableC3") where compressed air is replaced with vacuum in FIG. 10.

The data table 130 ("TableC5") may be populated with data as follows. First, the section describing the calibration of table 122 ("TableC1") described the measurement of $\dot{m}_{WG}$ and how it is converted into $\dot{m}_{WG}^{@SonicStdCond}$. One may, having collected the data for various waste-gate valve positions, $ValvePos_{WG}^{des}$, may simply populate the data table 130 ("TableC5").

It should be understood that electronic controller 14 as described above may include conventional processing apparatus known in the art, capable of executing pre-programmed instructions stored in an associated memory, all performing in accordance with the functionality described herein. That is, it is contemplated that the processes described herein will be programmed in a preferred embodiment, with the resulting software code being stored in the associated memory. Implementation of the present invention, in software, in view of the foregoing enabling description, would require no more than routine application of programming skills by one of ordinary skill in the art. Such an electronic controller may further be of the type having both ROM, RAM, a combination of non-volatile and volatile (modifiable) memory so that the software can be stored and yet allow storage and processing of dynamically produced data and/or signals.

It is to be understood that the above description is merely exemplary rather than limiting in nature, the invention being limited only by the appended claims. Various modifications and changes may be made thereto by one of ordinary skill in the art, which embody the principles of the invention and fall within the spirit and scope thereof.

Chart 1 correlates the various symbols/terms with its description:

| Symbol | Description |
|---|---|
| R | Gas constant |
| $k_{air}$ | Ratio of specific heats, air |
| $k_{exh}$ | Ratio of specific heats, exhaust |
| $c_{p,air} = c_p^a$ | Specific heat at constant pressure, air |
| $c_{p,exh} = c_p^c$ | Specific heat at constant pressure, exhaust |
| Baro | Barometric pressure |
| $P_{amb}$ | Ambient pressure |
| $P_{C,in}$ | Compressor inlet stagnation pressure |
| $P_{C,in}^{reference}$ | Reference compressor inlet stagnation pressure (from turbo manufacturers data) |
| $P_{std}$ | Standard Pressure (a defined reference). |
| $P_{C,out}$ | Compressor outlet stagnation pressure |
| $P_{C,out}^{des}$ | Desired compressor outlet stagnation pressure |
| $P_{Boost}$ | Boost pressure (after intercooler, before throttle) |
| $P_{Boost}^{des}$ | Desired Boost Pressure (after intercooler, before throttle) |
| MAP | Intake Manifold Absolute Pressure |
| $P_{EM} (= P_{T,in})$ | Exhaust manifold stagnation pressure |
| $P_{EM}^{des}$ | Desired exhaust manifold stagnation pressure |
| $P_{T,in} (= P_{EM})$ | Turbine inlet stagnation pressure |

-continued

| Symbol | Description |
|---|---|
| $P_{T,out}$ | Turbine outlet stagnation pressure |
| $P_{T,out}^{des}$ | Desired turbine outlet stagnation pressure |
| $\Delta P_{Airfilter}$ | Airfilter pressure drop |
| $\Delta P_{Intercooler}$ | Intercooler pressure drop |
| $P_{vac}$ | Pressure of vacuum source used for waste-gate actuation. |
| $\Delta P_{WG}$ | Waste-gate valve delta pressure |
| $\Delta P_{WG}^{des} (= \Delta P_T^{des})$ | Desired waste-gate valve delta pressure |
| $\Delta P_{WG,Dphr}$ | Waste-gate diaphragm delta pressure |
| $\Delta P_{WG,Dphr}^{des}$ | Desired waste-gate diaphragm delta pressure |
| $\Delta P_{WG,Dphr}^{des,base}$ | Desired waste-gate diaphragm delta pressure, base look-up |
| $\Delta P_{WG,Dphr}^{des,TransientTerm}$ | Desired waste-gate diaphragm delta pressure, transient term |
| $\Delta P_{WG,Dphr}^{des,CL}$ | Desired waste-gate diaphragm delta pressure, closed-loop term |
| $\Delta P_{WG,S\ Ind}^{des}$ | Desired waste-gate solenoid delta pressure |
| $\Delta P_T^{des} (= \Delta P_{WG}^{des})$ | Desired turbine delta pressure |
| $Pr_C$ | Compressor pressure ratio |
| $Pr_C^{des}$ | Desired compressor pressure ratio |
| $Pr_T$ | Turbine pressure ratio |
| $Pr_T^{des}$ | Desired turbine pressure ratio |
| $Pr_{exh}$ | Exhaust system pressure ratio (catalyst, muffler) |
| $Pr_{crit}$ | Critical pressure ratio |
| $T_{amb}$ | Ambient air temperature |
| $T_{C,in} (\approx T_{amb})$ | Compressor inlet air stagnation temperature |
| $T_{C,in}^{reference}$ | Reference compressor inlet air stagnation temperature (from turbo manufacturers data) |
| $T_{std}$ | Standard Temperature (a defined reference). |
| $T_{EM} (= T_{T,in})$ | Exhaust manifold gas stagnation temperature |
| $T_{T,in} (= T_{EM})$ | Turbine inlet stagnation temperature |
| $T_{T,out}$ | Turbine outlet stagnation temperature |
| $T_{T,out,w/o\ HT}$ | Turbine outlet stagnation temperature not accounting for heat loss |
| $\dot{m}_C$ | Compressor mass flow rate |
| $\dot{m}_C^{des}$ | Desired compressor mass flow rate |
| $\dot{m}_T$ | Turbine mass flow rate |
| $\dot{m}_{T,cor}$ | Corrected turbine mass flow rate |
| $\dot{m}_T^{des}$ | Desired turbine mass flow rate |
| $\dot{m}_{T,cor}^{des}$ | Desired corrected turbine mass flow rate |
| $\dot{m}_{eng}$ | Engine mass flow rate |
| $\dot{m}_{eng,cor}$ | Corrected engine mass flow rate |
| $\dot{m}_{eng,air}^{des}$ | Desired engine air mass flow rate from torque control |
| $\dot{m}_{eng,air}^{@Max\ desBoost}$ | Engine air mass flow rate at maximum desired boost |
| $\dot{m}_{eng,air}^{@desBoost}$ | Engine air mass flow rate at desired boost |
| $\dot{m}_{WG}$ | Waste-gate mass flow rate |
| $\dot{m}_{WG}^{des}$ | Desired waste-gate mass flow rate |
| $\dot{m}_{WG}^{des\ @\ SonicStdCond}$ | Desired waste-gate mass flow rate at standard sonic conditions |
| $\dot{m}_{exh}$ | Exhaust system mass flow rate |
| $\dot{m}_{exh}^{des}$ | Desired exhaust system mass flow rate |
| $\dot{m}_{EGR}$ | EGR mass flow rate |
| $\dot{V}_{C,cor}$ | Corrected compressor volume flow rate |
| $\dot{V}_{C,cor}^{des}$ | Desired corrected compressor volume flow rate |
| $\eta_C$ | Compressor isentropic efficiency |
| $\eta_T$ | Turbine isentropic efficiency |
| $P_C$ | Power absorbed by compressor |
| $P_C^{des}$ | Desired power absorbed by compressor |
| $P_T$ | Power produced by turbine |
| $\Delta h_C$ | Compressor enthalpy delta |
| $\Delta h_C^{des}$ | Desired compressor enthalpy delta |
| $\dot{N}_{T,cor}$ | Corrected turbo-charger rotational speed |

-continued

| Symbol | Description |
|---|---|
| $\dot{N}_{T,cor}^{des}$ | Desired corrected turbo-charger rotational speed |
| VE | Volumetric efficiency |
| $A = \left( \dfrac{P_C}{\eta_T c_p^e T_{T,in}} \right)$ | Turbo Power Term (home made word) |
| $A^{des}$ | Desired Turbo Power Term (home made word) |
| $B = \dfrac{\sqrt{T_{T,in}}}{P_{T,out}}$ | Turbine Boundary Term (home made word) |
| $B^{des}$ | Desired Turbine Boundary Term (home made word) |
| $\beta_2$ | Normalized valve flow dependency on pressure ratio for compressible fluid |
| $DutyCycle_{WG,S\,In\,d}$ | Waste-gate solenoid commanded duty-cycle |
| $ValvePos_{WG}^{des}$ | Desired waste-gate valve position |

The invention claimed is:

1. A method of optimizing boost pressure of an internal combustion engine having a turbo-charger with a compressor and an exhaust driven turbine with a waste-gate flow path that bypasses the turbine in a parallel path, and a waste-gate mass flow rate $\dot{m}_{WG}$ through the waste-gate flow path being adjustable by a waste-gate valve, comprising the steps of:

providing an engine controller being in electrical communication with the engine; providing a desired boost pressure $P_{Boost}^{des}$ from the engine to the engine controller:

calculating a desired waste-gate mass flow rate $\dot{m}_{WG}^{des}$ in the waste-gate flow path with the engine controller, said calculated desired waste-gate mass flow rate $\dot{m}_{WG}^{des}$ being a function of the provided desired boost pressure $P_{Boost}^{des}$; and generating the control signal from the controller being received by the waste-gate valve, wherein the engine controller is adapted to operatively control the waste-gate valve using the control signal such that the waste-gate mass flow rate $\dot{m}_{WG}$ through the waste-gate flow path attains the calculated desired waste-gate mass flow rate $\dot{m}_{WG}^{des}$, wherein said step of calculating the desired waste-gate mass flow rate $\dot{m}_{WG}^{des}$ further includes the desired waste-gate mass flow rate $\dot{m}_{WG}^{des}$ being a desired waste-gate mass flow rate at standard sonic conditions $\dot{m}_{WG}^{des@SonicStdCond}$ across the waste-gate valve, and calculating the desired waste-gate mass flow rate at standard sonic conditions $\dot{m}_{WG}^{des@SonicStdCond}$ using a desired pressure ratio $Pr_T^{des}$ includes the sub-steps of, determining a desired compressor mass flow rate $\dot{m}_C^{des}$ with the engine controller;

determining a desired compressor pressure ratio $Pr_C^{des}$ using the provided determined, desired boost pressure $P_{Boost}^{des}$ with the engine controller;

determining a desired compressor power $P_C^{des}$ with the engine controller using the determined desired compressor mass flow rate $\dot{m}_C^{des}$ and the determined desired compressor pressure ratio $Pr_C^{des}$ and predetermined compressor characteristics data;

determining a desired corrected turbine mass flow rate $\dot{m}_{T,cor}^{des}$ with the engine controller using the determined desired compressor power $P_C^{des}$, the desired corrected turbine mass flow rate $\dot{m}_{T,cor}^{des}$ being a function of a product term (A*B), and the product term (A*B) including a turbine power term (A) having the determined desired compressor power $P_C^{des}$ and a turbine boundary term (B) having a turbine outlet pressure $P_{T,out}$;

determining a desired turbine pressure ratio $Pr_T^{des}$ with the engine controller using the determined desired corrected turbine mass flow rate $\dot{m}_{T,cor}^{des}$; and determining the desired waste-gate mass flow rate at standard sonic conditions $\dot{m}_{WG}^{des@SonicStdCond}$ with the engine controller using the desired turbine pressure ratio $Pr_T^{des}$.

2. The method of claim 1 wherein said step of providing the desired boost pressure $P_{Boost}^{des}$ further includes the desired boost pressure $P_{Boost}^{des}$ is a function of a desired engine torque.

3. The method of claim 1 wherein a position of the waste-gate valve is controlled by an electrical motor, said step of generating the control signal comprises the sub-steps of, determining a waste-gate valve position $ValvePos_{WG}^{des}$ using the desired waste-gate mass flow rate at standard sonic conditions $\dot{m}_{WG}^{des@SonicStdCond}$;

producing the control signal in accordance with said determined waste gate valve position; and applying the control signal from the engine controller to the electrical motor.

4. The method of claim 3 further including the step of, establishing a position-versus-flow mathematical model that correlates desired waste-gate mass flow rate at standard sonic conditions $\dot{m}_{WG}^{des@SonicStdCond}$ with waste-gate valve position $ValvePos_{WG}^{des}$; and obtaining a value for the waste-gate valve position $ValvePos_{WG}^{des}$ using the position-versus-flow mathematical model.

5. The method of claim 1 wherein the turbo-charger includes a variable geometry turbine (VGT) turbo-charger, and said step of generating the control signal further include controlling the waste-gate valve so as to achieve the desired waste-gate mass flow rate at standard sonic conditions $\dot{m}_{WG}^{des@SonicStdCond}$ being performed as a function of VGT position.

6. The method of claim 1 wherein the step of providing the engine controller further includes providing data tables disposed in a memory of the engine controller, and said data tables including data values measured for a plurality of engine system operating conditions associated with the engine, and the data tables comprising a predetermined compressor enthalpy delta table, a predetermined turbo corrected speed data table, a predetermined turbine efficiency ($\eta_T$) data table, a predetermined turbine pressure ratio/corrected engine flow data table, a predetermined product term (A*B) data table, a predetermined pressure data drop-exhaust system data table, and a predetermined heat transfer calibration table, wherein the engine controller uses the data tables for the calculating the desired waste-gate flow rate $\dot{m}_{WG}^{des}$ and the engine controller accesses at least one of the data tables after the step of providing the engine controller and prior to the step of generating the control signal.

7. The method of claim 1 further including, configuring a control signal with the engine controller based on the calculated desired waste-gate mass flow rate $\dot{m}_{WG}^{des}$ to allow operative communication with the waste-gate valve before the step of generating the control signal, wherein the step of configuring the control signal with the engine controller further includes providing data tables disposed in a memory of the engine controller, and said data tables including data values measured for a plurality of waste-gate value operating conditions associated with the waste-gate value in the engine, and the data tables comprising at least one of,
(i) a desired waste-gate valve position table,
(ii) a desired waste-gate diaphragm delta pressure $\Delta P_{WG, Dphr}$ data table,
(iii) a transient response improvement term data table,
(iv) a desired waste-gate solenoid duty cycle data table where the waste-gate valve is pneumatically actuated using boost pressure adjusted through a solenoid, and
(v) a desired waste-gate solenoid duty cycle data table where the waste-gate valve is pneumatically actuated using a vacuum source adjusted through a solenoid, wherein the engine controller uses at least one of the data tables to further configure the control signal to operatively communicate with the waste-gate valve, and the engine controller accesses at least one of the data tables after the step of providing the engine controller.

8. The method of claim 1 wherein the calculated desired waste-gate mass flow rate $\dot{m}_{WG}^{des}$ is a calculated desired waste-gate mass flow rate at standard sonic conditions $\dot{m}_{WG}^{des@SonicStdCond}$ defined by the mathematical relationship $$\dot{m}_{WG}^{des@SonicStdCond} = \dot{m}_{WG}^{des} \frac{P_{std}}{P_{EM}^{des}} \sqrt{\frac{T_{EM}}{T_{std}}} \frac{1}{\beta_2(1/Pr_T^{des})}$$

where
$\dot{m}_{WG}^{des@SonicStdCond}$ = the calculated desired waste-gate mass flow rate at standard sonic conditions,
$\dot{m}_{WG}^{des@SonicStdCond}$ = the desired waste-gate mass flow rate,
$P_{std}$ = a Standard Pressure (a defined reference),
$P_{EM}^{des}$ = a desired exhaust manifold stagnation pressure,
$T_{EM}$ = a Exhaust manifold gas stagnation temperature,
$T_{std}$ = a Standard Temperature (a defined reference),
$\beta_2$ = a normalized valve flow dependency on pressure ratio for compressible fluid, and
$Pr_T^{des}$ = the desired turbine pressure ratio.

9. A method of optimizing boost pressure of an internal combustion engine having a turbo-charger with a compressor and an exhaust driven turbine with a waste-gate flow path that bypasses the turbine in a parallel path, and a waste-gate mass flow rate $\dot{m}_{WG}$ through the waste-gate flow path being adjustable by a waste-gate valve, comprising the steps of:
providing an engine controller being in electrical communication with the engine; providing a desired boost pressure $P_{Boost}^{des}$ from the engine to the engine controller:
calculating a desired waste-gate mass flow rate $\dot{m}_{WG}^{des}$ in the waste-gate flow path with the engine controller, said calculated desired waste-gate mass flow rate $\dot{m}_{WG}^{des}$ being a function of the provided desired boost pressure $P_{Boost}^{des}$; and
generating the control signal from the controller being received by the waste-gate valve, wherein the engine controller is adapted to operatively control the waste-gate valve using the control signal such that the waste-gate mass flow rate $\dot{m}_{WG}$ through the waste-gate flow path attains the calculated desired waste-gate mass flow rate $\dot{m}_{WG}^{des}$,
wherein the waste-gate valve is pneumatically actuated using boost pressure adjusted through a solenoid, said step of generating the control signal with the engine controller comprises the sub-steps of, determining a duty cycle $DutyCycle_{WG,S\,In\,d}$ with the engine controller using the desired waste-gate mass flow rate at standard sonic conditions $\dot{m}_{WG}^{des@SonicStdCond}$;
producing the control signal in accordance with said determined duty cycle; and
applying the control signal from the engine controller to the solenoid,
wherein the waste-gate valve is linked to and controlled by a waste-gate diaphragm and where the solenoid adjusts the boost pressure applied to the diaphragm, said sub-step of determining a duty cycle further including includes the sub-step of,
determining a desired pressure delta across the waste-gate diaphragm $\Delta P_{WG,Dphr}^{des}$,
wherein said step of determining the desired pressure delta across the waste-gate diaphragm $\Delta P_{WG,Dphr}^{des}$ further includes,
establishing a first mathematical model that correlates the desired waste-gate mass flow rate at standard sonic conditions $\dot{m}_{WG}^{des@SonicStdCond}$ and desired waste gate valve delta pressure $\Delta P_{WG}^{des}$ being a function of a desired base pressure delta across the waste-gate diaphragm $\Delta P_{WG,Dphr}^{des,base}$; and
obtaining a value for the desired base pressure delta across the waste-gate diaphragm $\Delta P_{WG,Dphr}^{des,base}$ using the first mathematical model,
wherein said step of obtaining the value for the determining a desired base pressure delta across the waste-gate diaphragm $\Delta P_{WG,Dphr}^{des,base}$ further includes,
establishing a second mathematical model that correlates a difference between boost ressure $P_{Boost}$ and the desired boost pressure $P_{Boost}^{des}$ to a transient response pressure delta across the waste-gate diaphragm $\Delta P_{WG,Dphr}^{des,TransientTerm}$; and
obtaining a value for the transient response pressure delta across the waste-gate diaphragm $\Delta P_{WG,Dphr}^{des,TransientTerm}$ using the second mathematical model,
wherein said step of obtaining the value for the desired pressure delta across the waste-gate diaphragm $P_{WG,Dphr}^{des}$ is an arithmetic summation of $\Delta P_{WG,Dphr}^{des,base}$ and $\Delta P_{WG,Dphr}^{des,TransientTerm}$ and $\Delta P_{WG,Dphr}^{des,CL}$, where $\Delta P_{WG,Dphr}^{des,CL}$ is a closed loop correction term to correct model inaccuracies.

10. The method of claim 9 wherein said step of determining the duty cycle $DutyCycle_{WG,S\,In\,d}$ further includes,
determining a desired waste-gate solenoid pressure delta $\Delta P_{WG,S\,In\,d}^{des}$.

11. The method of claim 10 wherein said step of determining a desired waste-gate solenoid pressure delta $\Delta P_{WG,S\,In\,d}^{des}$ further includes,
subtracting an ambient pressure $P_{amb}$ and the waste-gate diaphragm pressure delta $\Delta P_{WG,Dphr}^{des}$ from the desired boost pressure $P_{Boost}^{des}$ to obtain the desired waste-gate solenoid pressure delta $\Delta P_{WG,S\,In\,d}^{des}$.

12. The method of claim 11 wherein said step of determining the duty cycle $DutyCycle_{WG,S\,In\,d}$ further includes,
establishing a third data structure correlating boost pressure $P_{Boost}$ and the desired waste-gate solenoid pressure delta $\Delta P_{WG,S\,In\,d}^{des}$ to the duty cycle $DutyCycle_{WG,S\,In\,d}$; and
obtaining a value for the duty cycle $DutyCycle_{WG,S\,In\,d}$ using the third mathematical model.

13. A method of optimizing boost pressure of an internal combustion engine having a turbo-charger with a compressor and an exhaust driven turbine with a waste-gate flow path that bypasses the turbine in a parallel path, and a waste-gate mass flow rate $\dot{m}_{WG}$ through the waste-gate flow path being adjustable by a waste-gate valve, comprising the steps of:

provinding an engine controller being in electrical communication with the engine; providing a desired boost pressure $P_{Boost}^{des}$ from the engine to the engine controller;

calculating a desired waste-gate mass flow rate $\dot{m}_{WG}^{des}$ in the waste-gate flow path with the engine controller, said calculated desired waste-gate mass flow rate $\dot{m}_{WG}^{des}$ being a function of the provided desired boost pressure $P_{Boost}^{des}$; and generating the control signal from the controller being received by the waste-gate valve, wherein the engine controller is adapted to operatively control the waste-gate valve using the control signal such that the waste-gate mass flow rate $\dot{m}_{WG}$ through the waste-gate flow path attains the calculated desired waste-gate mass flow rate $\dot{m}_{WG}^{des}$, wherein the waste-gate valve is pneumatically actuated using a vacuum source adjusted through a solenoid, said step of generating the control signal comprises the sub-steps of, determining a duty cycle $DutyCycle_{WG,S\ In\ d}$ using the desired waste-gate mass flow rate at standard sonic conditions $\dot{m}_{WG}^{des@SonicStdCond}$;

producing the control signal in accordance with the determined duty cycle;

applying the control signal from the engine controller to the solenoid, wherein the waste-gate valve is linked to and controlled by a waste-gate diaphragm and where the solenoid adjusts the vacuum applied to the diaphragm, said sub-step of determining the duty cycle includes the sub-step of, determining a desired pressure delta across the waste-gate diaphragm $\Delta P_{WG,Dphr}^{des}$, wherein said step of determining the desired pressure delta across the waste-gate diaphragm $\Delta P_{WG,Dphr}^{des}$ includes, establishing a first mathematical model that correlates desired waste-gate mass flow rate at standard sonic conditions $\dot{m}_{WG}^{des@SonicStdCond}$ and desired waste-gate valve delta pressure $\Delta P_{WG}^{des}$ to a desired base pressure delta across the waste-gate diaphragm $\Delta P_{WG,Dphr}^{des,base}$; and obtaining a value for the desired base pressure delta across the waste-gate diaphrag $\Delta P_{WG,Dphr}^{des,base}$ using the first mathematical model, wherein said step of obtaining the value for the determining a desired base pressure delta across the waste-gate diaphragm $\Delta P_{WG,Dphr}^{des,base}$ includes, establishing a second mathematical model that correlates a difference between boost ressure $P_{Boost}$ and the desired boost pressure $P_{Boost}^{des}$ to a transient response pressure delta across the waste-gate diaphragm $\Delta P_{WG,Dphr}^{des,TransientTerm}$; and obtaining a value for the transient response pressure delta across the waste-gate diaphragm $\Delta P_{WG,Dphr}^{des,TransientTerm}$ using the second mathematical model, desired pressure delta across the waste-gate $\Delta P_{WG,Dphr}^{des}$ is an arithmetic summation of $\Delta P_{WG,Dphr}^{des,base}$ and $\Delta P_{WG,Dphr}^{des,TransientTerm}$ and $\Delta P_{WG,Dphr}^{des,CL}$, where $\Delta P_{WG,Dphr}^{des,CL}$ is a closed loop correction term to correct model inaccuracies.

14. The method of claim 13 wherein said step of determining the duty cycle $DutyCycle_{WG,S\ In\ d}$ includes,
determining a desired waste-gate solenoid pressure delta $\Delta P_{WG,S\ In\ d}^{des}$.

15. The method of claim 14 wherein said step of determining the desired waste-gate solenoid pressure delta $\Delta P_{WG,S\ In\ d}^{des}$ includes,
subtracting an ambient pressure $P_{amb}$ and the waste-gate diaphragm pressure delta $\Delta P_{WG,Dphr}^{des}$ from a vacuum source pressure $P_{vac}$ to obtain the desired waste-gate solenoid pressure delta $\Delta P_{WG,S\ In\ d}^{des}$.

16. The method of claim 15 wherein said step of obtaining the duty cycle $DutyCycle_{WG,S\ In\ d}$ further includes,
establishing a vacuum solenoid mathematical model correlating desired waste-gate solenoid pressure delta $\Delta P_{WG,S\ In\ d}^{des}$ and vacuum source pressure $P_{vac}$ with the duty cycle $DutyCycle_{WG,S\ In\ d}$; and
obtaining a value for the duty cycle $DutyCycle_{WG,S\ In\ d}$ using the vacuum solenoid mathematical model.

17. The method of claim 15 wherein said step of obtaining the duty cycle $DutyCycle_{WG,S\ In\ d}$ further includes,
establishing a vacuum solenoid mathematical model Correlating desired waste-gate diaphragm delta pressure $\Delta P_{WG,\ Dphr}^{des}$ with the duty cycle $DutyCycle_{WG,S\ In\ d}$; and
obtaining a value for the duty cycle $DutyCycle_{WG,S\ In\ d}$ using the vacuum solenoid mathematical model.

* * * * *